United States Patent
Niimi et al.

(10) Patent No.: US 12,492,330 B2
(45) Date of Patent: Dec. 9, 2025

(54) LATENT HEAT STORAGE GYPSUM BOARD AND PARTITION STRUCTURE

(71) Applicant: YOSHINO GYPSUM CO., LTD., Tokyo (JP)

(72) Inventors: Katsumi Niimi, Tokyo (JP); Yosuke Sato, Tokyo (JP); Daisuke Naito, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 148 days.

(21) Appl. No.: 18/560,518

(22) PCT Filed: Apr. 28, 2022

(86) PCT No.: PCT/JP2022/019429
§ 371 (c)(1),
(2) Date: Nov. 13, 2023

(87) PCT Pub. No.: WO2022/259785
PCT Pub. Date: Dec. 15, 2022

(65) Prior Publication Data
US 2024/0247176 A1    Jul. 25, 2024

(30) Foreign Application Priority Data
Jun. 7, 2021  (JP) .................. 2021-095442

(51) Int. Cl.
*E04C 2/04* (2006.01)
*C04B 11/00* (2006.01)
(Continued)

(52) U.S. Cl.
CPC .............. *C09K 5/063* (2013.01); *C04B 11/00* (2013.01); *C04B 41/009* (2013.01);
(Continued)

(58) Field of Classification Search
CPC ... Y02D 60/14; F28D 20/0056; F28D 20/023; E04C 2/043; E04C 2/526; E04C 2/049;
(Continued)

(56) References Cited

U.S. PATENT DOCUMENTS 4,572,864 A * 2/1986 Benson .................... C09K 5/00
                                                 428/116
5,053,446 A * 10/1991 Salyer ..................... C08L 23/06
                                                 523/205
(Continued)

FOREIGN PATENT DOCUMENTS

JP    H06-171008    6/1994
JP    2013-506774   2/2013
(Continued)

OTHER PUBLICATIONS

International Search Report for PCT/JP2022/019429 mailed on Jun. 28, 2022.
(Continued)

*Primary Examiner* — Kyle J. Walraed-Sullivan
(74) *Attorney, Agent, or Firm* — IPUSA, PLLC

(57) ABSTRACT

A latent heat storage gypsum plate includes: a gypsum plate having a first main face and a second main face located on an opposite side of the gypsum plate from the first main face; and a latent heat storage layer disposed over at least part of the first main face of the gypsum plate and including a latent heat storage material and a binder. A heat storage capacity of the latent heat storage gypsum plate is 260 KJ/m$^2$ or more, the heat storage capacity being measured in a measurement temperature range of from 15° C. through 35° C. through heat storage capacity measurement specified in ASTM C 1784. The latent heat storage gypsum plate exhibits heat generation property grade 1 as evaluated by a heat generation property test specified in JIS A 6901 (2014), with the
(Continued)

face in which the latent heat storage layer is disposed being set as a back face.

12 Claims, 6 Drawing Sheets

(51) Int. Cl.
| | |
|---|---|
| C04B 41/00 | (2006.01) |
| C04B 41/50 | (2006.01) |
| C04B 41/68 | (2006.01) |
| C09K 5/06 | (2006.01) |
| E04C 2/52 | (2006.01) |
| F28D 20/00 | (2006.01) |
| C04B 111/00 | (2006.01) |

(52) U.S. Cl.
CPC .......... *C04B 41/5024* (2013.01); *C04B 41/68* (2013.01); *E04C 2/043* (2013.01); *E04C 2/526* (2013.01); *F28D 20/0056* (2013.01); *C04B 2111/00629* (2013.01)

(58) Field of Classification Search
CPC ........ E04C 2/284; E04C 2/296; E04B 1/7608; E04B 1/767; E04B 1/80
See application file for complete search history.

(56) References Cited

U.S. PATENT DOCUMENTS

| | | | | | |
|---|---|---|---|---|---|
| 5,644,880 | A | * | 7/1997 | Lehnert | E04D 13/1643 |
| | | | | | 52/481.1 |
| 8,491,992 | B2 | * | 7/2013 | Schmidt | C08J 9/0009 |
| | | | | | 427/407.1 |
| 2002/0155282 | A1 | * | 10/2002 | Randall | E04C 2/043 |
| | | | | | 428/522 |
| 2003/0211305 | A1 | * | 11/2003 | Koval | E04C 2/043 |
| | | | | | 428/292.4 |
| 2003/0221717 | A1 | * | 12/2003 | Dessel | H02S 10/10 |
| | | | | | 136/201 |
| 2004/0005484 | A1 | * | 1/2004 | Veeramasuneni | E04C 2/043 |
| | | | | | 428/703 |
| 2004/0038065 | A1 | * | 2/2004 | Francis | B28B 19/0092 |
| | | | | | 156/39 |
| 2004/0170806 | A1 | * | 9/2004 | Hittle | B32B 5/22 |
| | | | | | 428/141 |
| 2004/0170873 | A1 | * | 9/2004 | Smith | G02B 6/2852 |
| | | | | | 428/703 |
| 2005/0055982 | A1 | * | 3/2005 | Medina | E04B 1/80 |
| | | | | | 52/506.01 |
| 2005/0178524 | A1 | * | 8/2005 | Pause | F28D 20/023 |
| | | | | | 165/48.1 |
| 2006/0260496 | A1 | * | 11/2006 | Pause | F28D 20/023 |
| | | | | | 101/494 |
| 2008/0014411 | A1 | * | 1/2008 | Schmidt | C08J 9/0009 |
| | | | | | 428/147 |
| 2010/0043344 | A1 | * | 2/2010 | Tada | C04B 28/10 |
| | | | | | 52/745.05 |
| 2012/0196116 | A1 | * | 8/2012 | Willax | B01J 13/14 |
| | | | | | 428/323 |
| 2013/0251986 | A1 | * | 9/2013 | Charlton | B32B 5/022 |
| | | | | | 427/372.2 |
| 2013/0318908 | A1 | * | 12/2013 | Holley | E04C 2/296 |
| | | | | | 428/313.9 |
| 2016/0222647 | A1 | * | 8/2016 | Thomas | E04C 2/26 |
| 2016/0222656 | A1 | * | 8/2016 | Teng | C03C 25/00 |
| 2016/0273783 | A1 | * | 9/2016 | Van Dyke | E06B 9/0638 |
| 2017/0297297 | A1 | * | 10/2017 | Queen | B32B 27/40 |
| 2017/0341337 | A1 | * | 11/2017 | Kirkwood | E04C 2/043 |
| 2018/0038101 | A1 | * | 2/2018 | Teng | B32B 13/14 |
| 2018/0156546 | A1 | * | 6/2018 | Naser | F28D 20/023 |
| 2019/0323235 | A1 | * | 10/2019 | Benson | E04C 3/34 |
| 2020/0120935 | A1 | * | 4/2020 | Wilson | A01N 43/56 |
| 2020/0270177 | A1 | * | 8/2020 | Teng | C04B 28/14 |
| 2020/0408471 | A1 | * | 12/2020 | Zhang | E04B 1/7608 |
| 2021/0171398 | A1 | * | 6/2021 | Wang | C04B 24/42 |
| 2021/0179506 | A1 | * | 6/2021 | Teng | C04B 28/14 |
| 2021/0230066 | A1 | * | 7/2021 | Thomas | C04B 41/483 |
| 2021/0230865 | A1 | * | 7/2021 | Fisler | E04C 2/288 |
| 2022/0177710 | A1 | * | 6/2022 | Smith | C09D 5/028 |
| 2025/0189237 | A1 | * | 6/2025 | Mandel | F28D 20/023 |

FOREIGN PATENT DOCUMENTS

| | | |
|---|---|---|
| JP | 2018-155076 | 10/2018 |
| JP | 2019-112929 | 7/2019 |
| JP | 2021-017796 | 2/2021 |

OTHER PUBLICATIONS

Written Opinion of the International Searching Authority for PCT/JP2022/019429 mailed on Jun. 28, 2022.
Biswas, K. et al. Thermal characterization of full-scale PCM products and numerical simulations, including hysteresis, to evaluate energy impacts in an envelope application. Applied Thermal Engineering, 2018,vol. 138, pp. 501-512 abstract.
Extended European search report mailed on Oct. 2, 2024 with respect to the corresponding European ptent application No. 22819971.7.

* cited by examiner

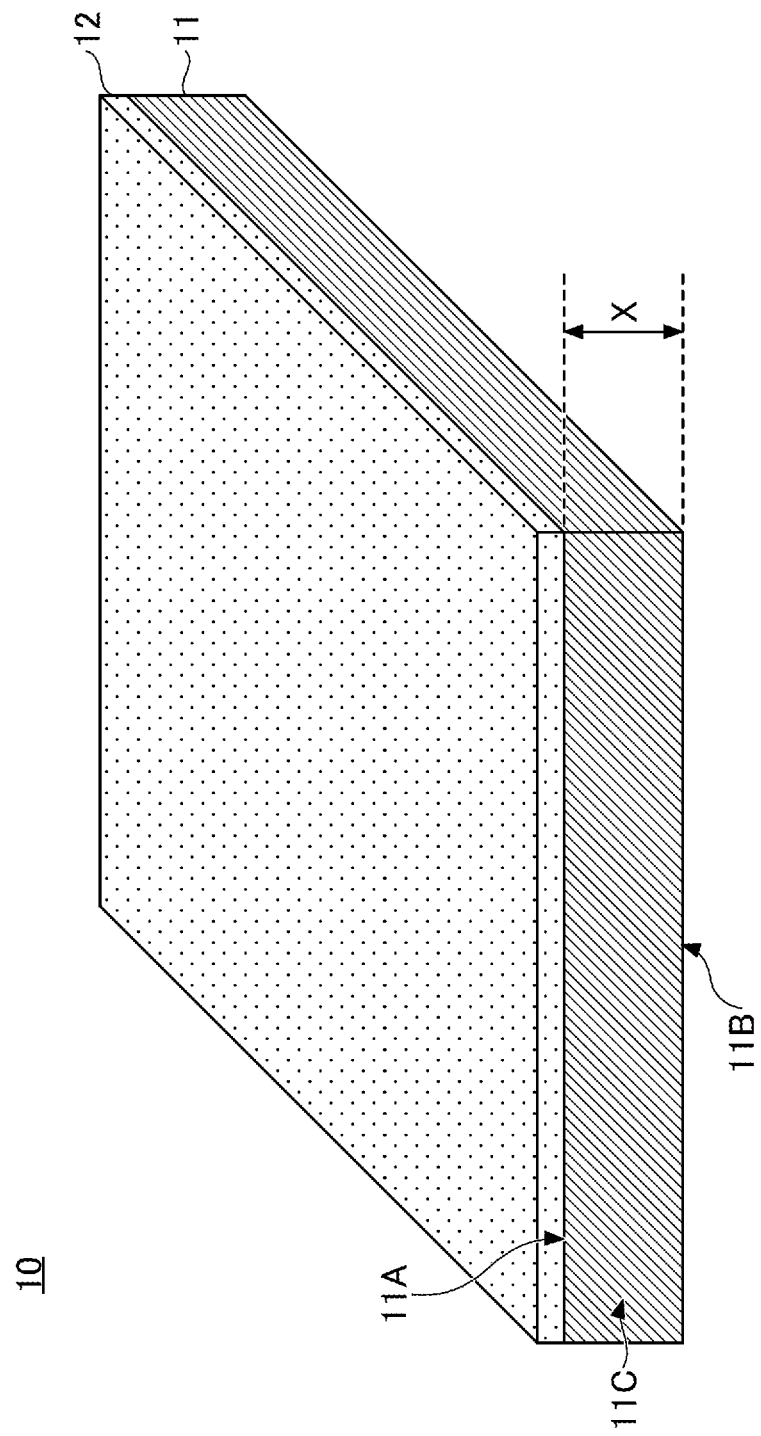

LATENT HEAT STORAGE GYPSUM BOARD AND PARTITION STRUCTURE

TECHNICAL FIELD

The present invention relates to a latent heat storage gypsum plate and a partition structure.

BACKGROUND ART

In conventional studies, latent heat storage materials are added to surface materials for building that are utilized indoors, such as gypsum boards. Such building materials suppress changes in indoor temperature by storing heat energy in the daytime in the latent heat storage materials and releasing the heat energy stored in the latent heat storage materials during the nighttime when the temperature falls.

For example, PTL 1 discloses a gypsum board including two cover layers and a gypsum core that contains a predetermined microcapsule and a polymer.

CITATION LIST

Patent Literature

PTL 1: PCT Japanese Translation Patent Publication No. 2013-506774

SUMMARY OF INVENTION

Technical Problem

Here, paraffin and the like are used as the latent heat storage materials. Thus, like the gypsum board disclosed in PTL 1, when the latent heat storage materials are added in the gypsum board, the amount of the latent heat storage materials added is limited in order to maintain incombustibility of the gypsum board.

In view of the problem in the related art, in one aspect of the present invention, it is an object to provide a latent heat storage gypsum plate having incombustibility and excellent heat storage capacity.

Solution to Problem

In order to solve the above problem, according to one embodiment of the present invention, a latent heat storage gypsum plate that is provided includes: a gypsum plate having a first main face and a second main face that is located on an opposite side of the gypsum plate from the first main face; and a latent heat storage layer disposed over at least part of the first main face of the gypsum plate, the latent heat storage layer including a latent heat storage material and a binder. A heat storage capacity of the latent heat storage gypsum plate is 260 kJ/m² or more, the heat storage capacity being measured in a measurement temperature range of 15° C. or higher and 35° C. or lower through heat storage capacity measurement specified in ASTM C 1784. The latent heat storage gypsum plate exhibits heat generation property grade 1 as evaluated by a heat generation property test specified in JIS A 6901 (2014), with the face in which the latent heat storage layer is disposed being set as a back face.

Advantageous Effects of Invention

According to one embodiment of the present invention, it is possible to provide a latent heat storage gypsum plate having incombustibility and excellent heat storage capacity.

BRIEF DESCRIPTION OF DRAWINGS

FIG. 1 is a perspective view of a latent heat storage gypsum plate according to an embodiment of the present invention.

DESCRIPTION OF EMBODIMENTS

Figure 2A:
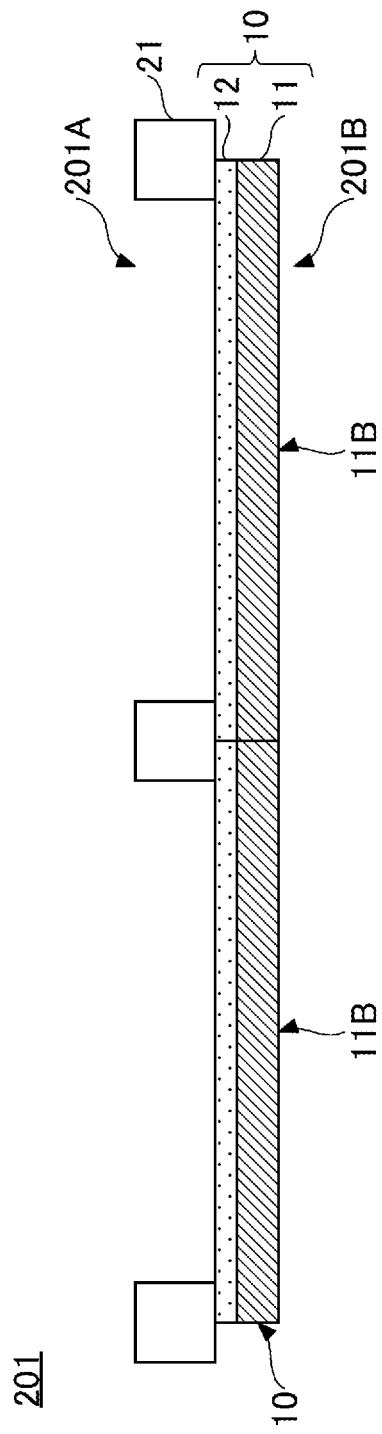
FIG. 2A illustrates a partition structure according to an embodiment of the present invention.

In the following, embodiments of the present invention will be described with reference to the drawings. However, the present invention is not limited to the following embodiments, and various modifications and substitutions can be added thereto without departing from the scope of the present invention.

[Latent Heat Storage Gypsum Plate]

One exemplary configuration of the latent heat storage gypsum plate of the present embodiment will be specifically described with reference to the drawings.

As illustrated in FIG. 1, a latent heat storage gypsum plate 10 of the present embodiment can include a gypsum plate 11 and a latent heat storage layer 12.

The gypsum plate 11 includes a first main face 11A and a second main face 11B that is located on an opposite side of the gypsum plate 11 from the first main face 11A. Note that, the gypsum plate 11 can have, for example, a plate shape as illustrated in FIG. 1. The first main face 11A and the second main face 11B are faces that cross the thickness direction and have the largest area, as illustrated in FIG. 1.

The latent heat storage layer 12 can be disposed over at least part of the first main face 11A of the gypsum plate 11. In other words, the latent heat storage layer 12 can be disposed so as to cover at least part of the first main face 11A of the gypsum plate 11. Note that, the latent heat storage layer 12 is preferably directly formed on the first main face 11A of the gypsum plate 11. In other words, no other member is preferably disposed between the gypsum plate 11 and the latent heat storage layer 12.

In the latent heat storage gypsum plate 10 of the present embodiment, as described above, separately from the gypsum plate 11, the latent heat storage layer 12 is provided over the first main face 11A of the gypsum plate 11. Therefore, the second main face 11B of the gypsum plate 11 may not be provided with the latent heat storage layer 12. As a result, when the latent heat storage gypsum plate is heated from the second main face 11B side, the effect of incombustibility by virtue of the gypsum plate 11 can be obtained. Thus, the latent heat storage gypsum plate can readily have incombustibility.

Also, when the latent heat storage layer 12 is provided on or above the first main face 11A of the gypsum plate 11, the latent heat storage layer 12 can enable the latent heat storage gypsum plate to have excellent heat storage capacity.

In particular, as described above, since the second main face 11B side is a face where the gypsum plate 11 is exposed, incombustibility is readily ensured. Therefore, as compared with the case in which the latent heat storage material is added into the gypsum plate 11, restriction to be imposed for making the latent heat storage gypsum plate incombustible is alleviated, such as the amount of the latent heat storage material to be added to the latent heat storage layer 12. As a result, it is possible to make the latent heat storage gypsum plate having particularly excellent heat storage capacity.

That is, the latent heat storage gypsum plate having the above configuration can be a latent heat storage gypsum plate having incombustibility and excellent heat storage capacity.

Note that, in the latent heat storage gypsum plate 10 as illustrated in FIG. 1, the latent heat storage layer 12 is formed, as an example, all over the first main face 11A of the gypsum plate 11, which is however non-limiting. For example, in accordance with, for example, the extent of heat storage capacity required for the latent heat storage gypsum plate 10, the size and shape of the latent heat storage layer 12 can be selected. Therefore, the latent heat storage layer 12 may be disposed all over the first main face 11A of the gypsum plate 11, or may be disposed in only a part of the first main face 11A.

Also, regarding the shape of the latent heat storage layer, the latent heat storage layer does not necessarily have a continuous plane shape. The shape of the latent heat storage layer may be, for example, a linear shape, a dot shape, etc. The latent heat storage gypsum plate of the present embodiment may also have a plurality of discontinuous latent heat storage layers.

Preferably, the latent heat storage layer 12 is not disposed in the second main face 11B of the gypsum plate 11, and the gypsum plate 11 is exposed. Also, preferably, the latent heat storage layer 12 is not disposed in a side face 11C between the first main face 11A and the second main face 11B of the gypsum plate 11, and the gypsum plate 11 is exposed. Nonetheless, the second main face 11B and/or the side face 11C may be provided with the latent heat storage layer as long as incombustibility of the latent heat storage gypsum plate is not affected. Also, the second main face 11B and/or the side face 11C including a latent heat storage layer formed by, for example, unintentional adhesion of a latent heat storage material coating material in the production step is not excluded.

(1) Regarding the Members Included in the Latent Heat Storage Gypsum Plate

The members included in the latent heat storage gypsum plate of the present embodiment will be described below.

(1-1) Gypsum Plate (Kind of the Gypsum Plate)

The gypsum plate 11 is a plate body containing gypsum, and the gypsum plate 11 may be any of various kinds of gypsum plates. Examples of the gypsum plate 11 include glass mat gypsum boards, gypsum-containing plates containing glass fiber non-woven fabric, gypsum boards specified in JIS A 6901 (2014), light-weight or heavy-weight gypsum boards as compared with the gypsum boards specified in JIS A 6901 (2014) (hereinafter the gypsum boards specified in the above JIS and the light-weight or heavy-weight gypsum boards as compared with the gypsum boards specified in the above JIS will also be collectively referred to as a "gypsum board"), gypsum plates, and slug gypsum plates.

The glass mat gypsum board becomes, for example, a gypsum plate coated with a glass mat on a surface thereof.

The gypsum-containing plate containing glass fiber non-woven fabric becomes, for example, a gypsum plate including glass fiber non-woven fabric (glass tissue) embedded in the front face side thereof.

Also, the gypsum board becomes, for example, a gypsum plate whose surface is coated with a board paper sheet.

The gypsum plate described as a candidate for the gypsum plate 11 refers to a gypsum plate that is not classified as, for example, a glass mat gypsum board; e.g., a gypsum plate that does not contain any surface material or the like.

Therefore, preferably, the gypsum plate 11 is, for example, any one selected from glass mat gypsum boards, gypsum-containing plates containing glass fiber non-woven fabric, gypsum boards, gypsum plates, and slug gypsum plates.

Note that, preferably, the gypsum plate 11 does not contain a latent heat storage material.

(Thickness of Gypsum Plate)

No particular limitation is imposed on thickness X of the gypsum plate 11. From the viewpoint of enhancing incombustibility of the latent heat storage gypsum plate 10, the thickness X of the gypsum plate 11 is preferably 9.0 mm or larger, and more preferably 9.5 mm or larger.

No particular limitation is imposed on the upper limit of the thickness X of the gypsum plate 11. The latent heat storage gypsum plate of the present embodiment can be used as, for example, a partition structure such as a wall, a ceiling, or a floor that partitions an indoor space. Therefore, from the viewpoint of preventing the indoor space from narrowing when it is applied to, for example, a wall, a ceiling, or a floor, the thickness X of the gypsum plate 11 is preferably 15.0 mm or smaller.

(Specific Gravity of Gypsum Plate)

No particular limitation is imposed on the specific gravity of the gypsum plate 11. From the viewpoint of enhancing incombustibility of the latent heat storage gypsum plate 10, the specific gravity of the gypsum plate 11 is preferably 0.35 or higher, and more preferably 0.65 or higher.

No particular limitation is imposed on the upper limit of the specific gravity of the gypsum plate 11. From the viewpoint of enhancing handling ability at the time of construction, the upper limit thereof is preferably 1.43 or lower.

(1-2) Latent Heat Storage Layer

The latent heat storage layer can contain a latent heat storage material and a binder.

Although the latent heat storage layer can be composed only of the latent heat storage material and the binder, the latent heat storage layer can further contain any other components than the latent heat storage material and the binder, in accordance with required properties, requirements in the production step, etc.

(Latent Heat Storage Material)

The latent heat storage material is a material at least part of which can be used to store latent heat that is absorbed or released upon phase change. For example, it is possible to preferably use a material that can store heat energy in the daytime and release the heat energy at the time of reduction in temperature in, for example, the nighttime.

The latent heat storage material may be one or more materials selected from materials enclosing a latent heat storage substance in a microcapsule, materials obtained by impregnating an inorganic porous material with a latent heat storage substance, molten mixtures of a thermoplastic resin and a latent heat storage substance, olefin-based polymers, and crosslinked products of olefin-based polymers.

Note that, the latent heat storage substance in, for example, the material enclosing the latent heat storage substance in the microcapsule is a substance that can be used for storing latent heat that is absorbed or released upon phase change.

No particular limitation is imposed on the latent heat storage substance. The latent heat storage substance may be, for example, one or more selected from paraffin compounds, fatty acids, fatty acid esters, aliphatic ethers, aliphatic ketones, aliphatic alcohols, olefin-based polymers, inorganic hydrates, etc. Note that, the above materials may be used alone or in combination.

As described above, the latent heat storage substance can also be enclosed in the microcapsule for use. No particular limitation is imposed on the material of the microcapsule. The material of the microcapsule may be one or more selected from ethylene-vinyl alcohol copolymers, styrene-butadiene copolymers, (meth)acrylonitrile-butadiene copolymers, hydrogenated conjugated diene (co)polymers, poly(meth)acrylates, polyolefins, polystyrenes, poly(meth)acrylonitriles, polyamides, poly(meth)acrylamides, ethyl cellulose, polyurethanes, polyureas, polyurethane ureas, melamine resins, gelatin, carboxymethyl cellulose, gum arabic, etc.

Note that, the expression (meth)acrylonitrile refers to either or both of methacrylonitrile and acrylonitrile. The expression (meth)acrylate refers to either or both of methacrylate and acrylate. The expression (meth)acrylamide refers to either or both of methacrylamide and acrylamide. The expression (co)polymer refers to either or both of a copolymer and a homopolymer.

No particular limitation is imposed on the content of the latent heat storage material in the latent heat storage layer. The content of the latent heat storage material can be any content in accordance with the kind of the latent heat storage material to be used, the heat storage capacity required for the latent heat storage gypsum plate, etc. The latent heat storage layer 12 preferably contains the latent heat storage material at a concentration of 10 parts by mass or more and 69 parts by mass or less, more preferably by 15 parts by mass or more and 69 parts by mass or less, and further preferably by 18 parts by mass or more and 69 parts by mass or less, with the latent heat storage layer being 100 parts by mass.

When the above content of the latent heat storage material is 10 parts by mass or more, it is possible to sufficiently enhance the heat storage capacity of the latent heat storage gypsum plate even without making the latent heat storage layer excessively thick. When the above content of the latent heat storage material is 69 parts by mass or less, it is possible to form the latent heat storage layer as a uniform film, and moreover, enhance close adhesiveness to the underlying gypsum plate.

Note that, in the latent heat storage gypsum plate of the present embodiment, preferably, only the latent heat storage layer contains the latent heat storage material.

(Binder)

No particular limitation is imposed on the binder. The binder may be one or more selected from inorganic binders, organic binders, etc.

Examples of the organic binders include vinyl acetate-based binders and polyester-based binders. Examples of the inorganic binders include alkali metal silicate-based binders, phosphate-based binders, and silica sol-based binders.

From the viewpoint of, for example, handling ability, one or more selected from alkali metal silicate-based binders and vinyl acetate-based binders are contained as the binder.

(Inorganic Powder)

As described above, the latent heat storage layer can also contain any other components than the latent heat storage material and the binder. The latent heat storage layer may contain, for example, inorganic powder.

The inorganic powder may be, for example, talc.

When the latent heat storage layer contains inorganic powder, it is possible to enhance dispersibility and spinnability of the latent heat storage material-containing coating material (which contains the heat storage material and the binder) used for producing the latent heat storage layer. Also, it is possible to enhance uniformity of the blended materials in the latent heat storage layer that is formed by coating the gypsum plate with the latent heat storage material-containing coating material. Moreover, it is possible to prevent running of the latent heat storage material-containing coating material when forming the latent heat storage layer.

(Plasticizer)

The latent heat storage layer may contain, for example, a plasticizer.

No particular limitation is imposed on the plasticizer. Dibutyl phthalate or the like can be suitably used.

The plasticizer has the effect of improving surface properties of the latent heat storage layer, and can suppress occurrence of cracks.

(2) Regarding Properties of the Latent Heat Storage Gypsum Plate (2-1) Heat Storage Capacity A heat storage capacity of the latent heat storage gypsum plate of the present embodiment is 260 $KJ/m^2$ or more and more preferably 290 $KJ/m^2$ or more. The heat storage capacity is measured in a measurement temperature range of 15° C. or higher and 35° C. or lower through heat storage capacity measurement specified in ASTM C 1784.

When the heat storage capacity is 260 $kJ/m^2$ or more, change in indoor temperature can be particularly suppressed when the latent heat storage gypsum plate is used as a partition structure that partitions an indoor space, such as a wall, a ceiling, or a floor.

(2-2) Heat Generation Property Test

The latent heat storage gypsum plate of the present embodiment preferably exhibits heat generation property grade 1 as evaluated by a heat generation property test specified in JIS A 6901 (2014), with the face in which the latent heat storage layer is disposed being set as a back face.

Note that, the above heat generation property test is specified in Annex A of JIS A 6901 (2014), and the heat generation property grade 1 means satisfying the following judgement criteria with the heating time being set to 20 minutes. Specifically, the judgement criteria are: the total amount of heat generation up to the end of heating time shall be 8 $MJ/m^2$ or less; no generation of fissures, holes, etc. penetrating to the back surface of the test piece that are regarded detrimental to fire protective performance shall be observed within the heating time; and the highest heat generation rate shall not exceed 200 $kW/m^2$ continuously for 10 seconds or more within the heating time.

In the heat generation property test, the evaluation performed with the face in which the latent heat storage layer is disposed being set as a back face means evaluation performed with the second main face 11B being set as a front face, the second main face 11B being a face opposite to the first main face 11A of the gypsum plate 11 provided with the latent heat storage layer 12 included in the latent heat storage gypsum plate 10. This means that the heat generation property test is performed by irradiating the second main face 11B with radiant heat.

(2-3) Correlation of Thickness of Gypsum Plate, Specific Gravity of Gypsum Plate, and Heat Storage Capacity The thickness X (mm) of the gypsum plate, the specific gravity Y of the gypsum plate, and the heat storage capacity Z (kJ/m$^2$) preferably satisfy the following relation of formula (1).

$$Z \leq 126.48X + 928.61Y - 1732.0 \quad (1)$$

The thickness and the specific gravity of the gypsum plate are parameters that impact the incombustibility of the latent heat storage gypsum plate. Therefore, when the thickness X and the specific gravity Y of the gypsum plate and the heat storage capacity Z have the above relation of formula (1) as described above, it is possible to obtain the latent heat storage gypsum plate having particularly excellent incombustibility and heat storage capacity.

Note that, the thickness X of the gypsum plate 11 corresponds to thickness X in FIG. 1. The values at the right- and left-hand sides of the formula (1) are preferably subjected to rounding so as to have the same number of digits after the decimal point, followed by comparison. For example, the values of the right- and left-hand sides of the formula (1) are preferably calculated by rounding off the values at the second decimal places thereof. In other words, the right- and left-hand sides of the formula (1) are preferably rounded off to the first decimal places before comparison.

[Method for Producing the Latent Heat Storage Gypsum Plate]

Next, one exemplary method for producing the latent heat storage gypsum plate of the present embodiment will be described. According to the method for producing the latent heat storage gypsum plate of the present embodiment, the above-described latent heat storage gypsum plate can be produced. Therefore, the matters that have been already described will be partially omitted.

The method for producing the latent heat storage gypsum plate of the present embodiment may include a latent heat storage layer-forming step of forming the latent heat storage layer by coating at least part of the first main face of the gypsum plate with the latent heat storage material-containing coating material. The latent heat storage material-containing coating material can contain the above-described components that can be suitably contained in the latent heat storage layer. Note that, if necessary, the latent heat storage material-containing coating material can further contain a solvent, such as water, for adjusting and ensuring flowability upon being coated.

The raw materials used for forming the latent heat storage layer, the suitable amounts thereof, the suitably usable gypsum plates, etc. in the latent heat storage layer-forming step have been already described, and the description thereof is omitted.

No particular limitation is imposed on means or methods for coating at least part of the first main face of the gypsum plate with the latent heat storage material-containing coating material in the latent heat storage layer-forming step. It is preferable to perform the coating so that the thickness of a resulting latent heat storage layer becomes uniform. Therefore, no particular limitation is imposed on a coating method for coating the latent heat storage material-containing coating material in the latent heat storage layer-forming step.

Flow coating, roll coating, blade coating, etc. can be appropriately selected, and flow coating can be preferably used by virtue of simplicity thereof.

The roll coating is a method for coating a rotating roller with the latent heat storage material-containing coating material, thereby forming the latent heat storage layer on the surface of the gypsum plate with the roller.

The flow coating is a method for flowing down the latent heat storage material-containing coating material to the first main face of the gypsum plate so as to form a thin film from above of the gypsum plate being conveyed, thereby forming the latent heat storage layer on the first main face of the gypsum plate.

The blade coating is a method for blade-scraping the latent heat storage material-containing coating material supplied to the first main face of the gypsum plate and extending the scraped material on the first main face of the gypsum plate so as to have a desired thickness, thereby forming the latent heat storage layer.

Note that, the gypsum plate to be supplied to the latent heat storage layer-forming step may be previously subjected to, for example, masking in portions where no latent heat storage layer is to be formed, thereby forming the latent heat storage layer having a desired pattern.

The method for producing the latent heat storage gypsum plate of the present embodiment may include any step, in addition to the above-described latent heat storage layer-forming step.

If necessary, the method for producing the latent heat storage gypsum plate of the present embodiment may further include a drying step of drying the formed latent heat storage layer, a cutting step of cutting the latent heat storage gypsum plate or the gypsum plate serving as a raw material into any size, and other steps.

No particular limitation is imposed on the drying temperature in the drying step. For example, the drying temperature is preferably 100° C. or lower, and more preferably 70° C. or lower. This is because when the drying temperature is 100° C. or lower, it is possible to suppress occurrence of failures such as warpage of the latent heat storage gypsum plate and cracking in the latent heat storage layer.

Note that, no particular limitation is imposed on the lower limit of the drying temperature. From the viewpoint of productivity, the lower limit thereof is preferably 20° C. or higher, and more preferably 30° C. or higher.

[Partition Structure]

Figure 2B:
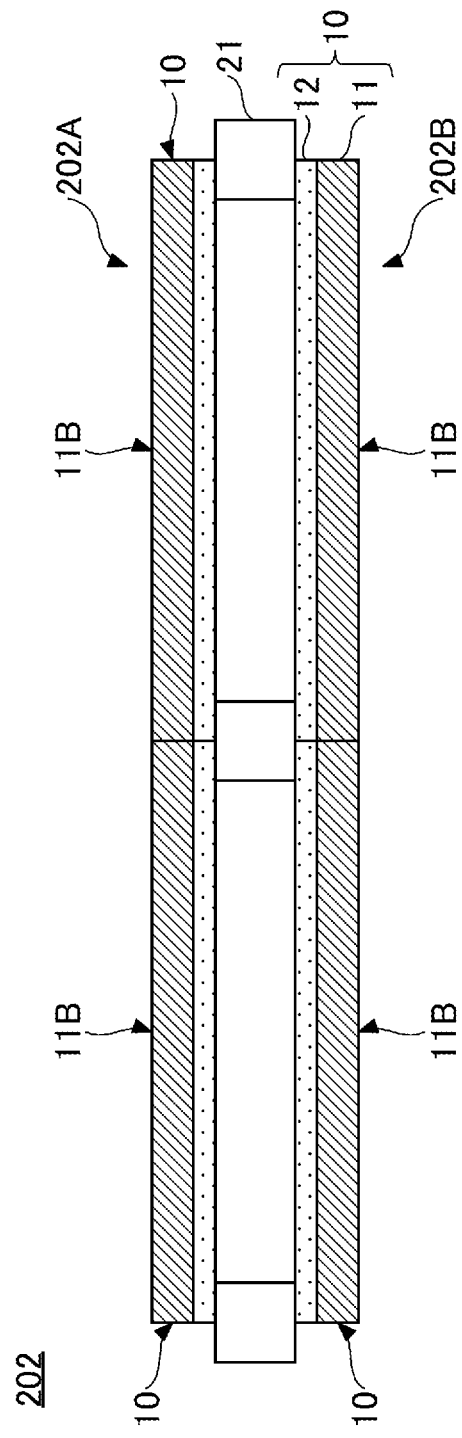
FIG. 2B illustrates a partition structure according to an embodiment of the present invention.
Figure 2C:
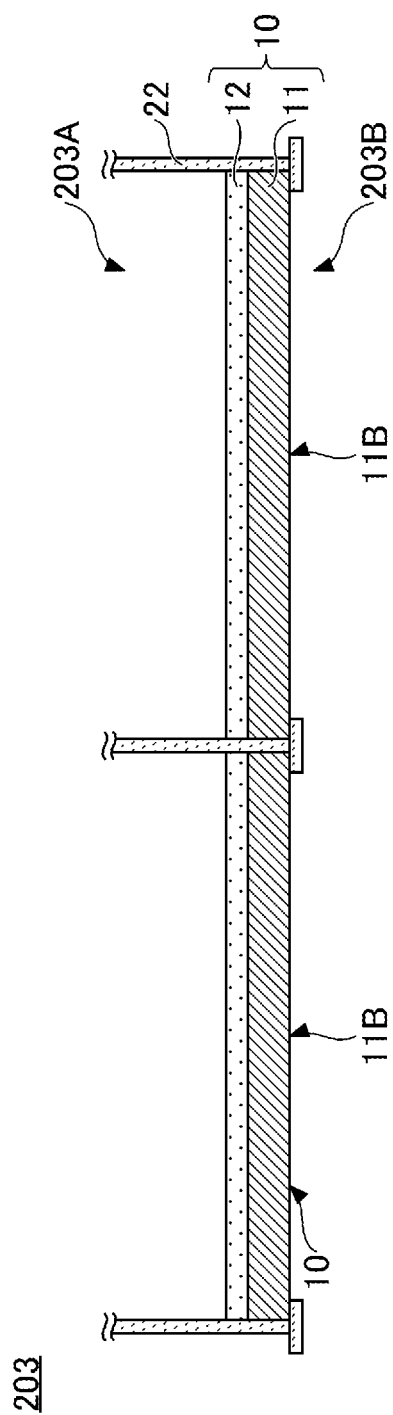
FIG. 2C illustrates a partition structure according to an embodiment of the present invention.

Next, an exemplary configuration of the partition structure using the above-described latent heat storage gypsum plate will be described with reference to FIG. 2A to FIG. 2C. FIG. 2A to FIG. 2C are side or top views of the partition structure.

The partition structure of the present embodiment is a partition structure that partitions an indoor space.

The partition structure of the present embodiment may include the latent heat storage gypsum plate and a base material that supports the latent heat storage gypsum plate.

The latent heat storage gypsum plate included in the partition structure of the present embodiment can be the above-described latent heat storage gypsum plate. The second main face of the gypsum plate included in the latent heat storage gypsum plate; i.e., a face opposite to the face provided with the latent heat storage layer can be disposed to face the indoor space.

Specifically, for example, as illustrated in FIG. 2A, a partition structure 201 of the present embodiment may include the latent heat storage gypsum plates 10 and base materials 21 that support the latent heat storage gypsum plates 10. Note that, the latent heat storage gypsum plates 10 may be fixed to the base materials 21 with a screw, a nail, etc.

The partition structure 201 as illustrated in FIG. 2A can be used as, for example, a wall, a ceiling, or a floor that partitions between an external space 201A and an indoor space 201B. Note that, the external space 201A means a space outside of the indoor space 201B and shall not be limited to an outdoor space.

In the partition structure 201, the second main face 11B of the gypsum plate 11 included in the latent heat storage gypsum plate 10; i.e., a face opposite to the first main face 11A of the gypsum plate 11 provided with the latent heat storage layer 12 can be disposed to face the indoor space 201B.

A fire or the like usually occurs in indoor spaces. Thus, when the exposed second main face 11B of the gypsum plate 11 is disposed to face the indoor space 201B, the partition structure can exhibit excellent incombustibility.

Similarly, the partition structure 202 of the present embodiment as illustrated in FIG. 2B may include the latent heat storage gypsum plates 10 and the base materials 21 that support the latent heat storage gypsum plates 10. Note that, the latent heat storage gypsum plates 10 may be fixed to the base materials 21 with a screw, a nail, etc.

The partition structure 202 as illustrated in FIG. 2B can be used as, for example, a partition wall that partitions between two indoor spaces 202A and 202B.

In the partition structure 202 as well, the second main faces 11B of the gypsum plates 11 included in the latent heat storage gypsum plates 10 are disposed to face the indoor space 202A and the indoor space 202B, respectively. More specifically, the second main faces 11B that are to contact the indoor spaces 202A and 202B in the gypsum plates 11 included in the latent heat storage gypsum plates 10 are disposed to face the indoor spaces 202A and 202B, respectively.

As described for the partition structure 201, a fire or the like usually occurs in indoor spaces. Thus, when the exposed second main faces 11B of the gypsum plates 11 are disposed to face the indoor spaces 202A and 202B, the partition structure can exhibit excellent incombustibility.

Similarly, the partition structure 203 of the present embodiment as illustrated in FIG. 2C may include the latent heat storage gypsum plates 10 and the base materials 22 that support the latent heat storage gypsum plates 10. Note that, the latent heat storage gypsum plates 10 may be just supported by the base materials 22, or may be fixed to the base materials 22 with a screw, a nail, etc.

The partition structure 203 of the present embodiment as illustrated in FIG. 2C can be used as, for example, a ceiling that partitions between an external space 203A above the ceiling and an indoor space 203B. Note that, examples of the partition structure having a configuration as illustrated in FIG. 2(C) include recessed ceilings.

In the partition structure 203 as well, the second main face 11B of the gypsum plate 11 included in the latent heat storage gypsum plate 10 is disposed to face the indoor space 203B.

As described for the partition structure 201, a fire or the like usually occurs in indoor spaces. Thus, when the exposed second main faces 11B of the gypsum plates 11 are disposed to face the indoor spaces 203B, the partition structure can exhibit excellent incombustibility.

FIG. 2A to FIG. 2C illustrate examples in which the gypsum plate included in the partition structure consists of the latent heat storage gypsum plate. The partition structure may include the above-described latent heat storage gypsum plate and a gypsum plate including no latent heat storage layer.

Also, no particular limitation is imposed on the number of gypsum plates included in the partition structure. Any number of gypsum plates may be included in accordance with, for example, a place where the partition structure is to be disposed.

The above-described partition structure of the present embodiment including the above-described latent heat storage gypsum plate has incombustibility and can be a partition structure having excellent heat storage property. The partition structure of the present embodiment can be used as, for example, a wall, a ceiling, or a floor.

EXAMPLES

The present invention will be described below by way of specific examples. However, the present invention should not be construed as being limited to these examples.

(1) Evaluation Method

Before describing experimental examples, evaluation methods for the latent heat storage gypsum plates obtained in the experimental examples below will be described.

(1-1) Flowability of Latent Heat Storage Material-Containing Coating Material

Flowability of the latent heat storage material-containing coating material, containing the latent heat storage material and the binder, was evaluated in the following manner.

Figure 3:
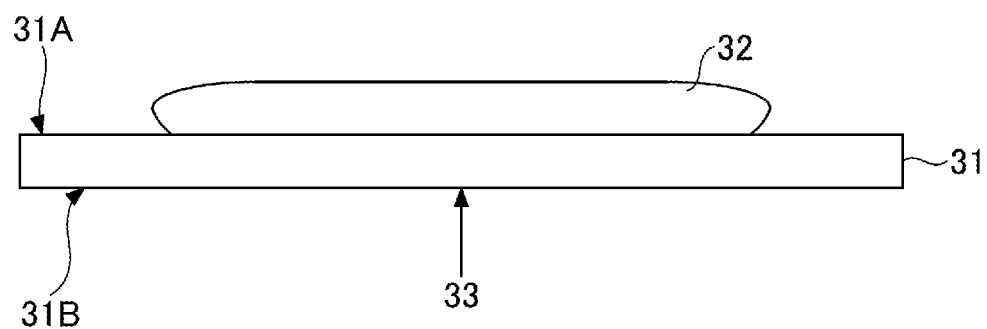
FIG. 3 illustrates a test method of flowability of a latent heat storage material-containing coating material.

First, as schematically illustrated in FIG. 3, 100 mL of a latent heat storage material-containing coating material 32 was allowed to flow on a first main face 31A of an acrylic plate 31. Then, after drying, the latent heat storage material-containing coating material 32 was visually observed along an arrow 33 from the side of a second main face 31B of the acrylic plate 31.

The case in which pinholes did not form in the dry latent heat storage material-containing coating material 32 was evaluated as "A", and the case in which pinholes formed in the dry latent heat storage material-containing coating material 32 was evaluated as "F". Note that, "A" means pass and "F" means fail.

The reason for this is as follows. Specifically, the pinholes in the dry latent heat storage material-containing coating material indicate that the latent heat storage material-containing coating material is insufficient in flowability and does not uniformly spread on the acrylic plate 31 resulting in the formation of the pinholes. The evaluation results are presented in the row "Flowability of coating material" in each table.

(1-2) Heat Storage Capacity

An obtained latent heat storage gypsum plate was evaluated for heat storage capacity according to ASTM C 1784 (the step method). The measurement temperature range was set to be 15° C. or higher and 35° C. or lower.

For evaluation, a thermal conductivity tester (product of EKO INSTRUMENTS CO., LTD., Model No.: HC-074) was used.

(1-3) Heat Generation Property Test

A heat generation property test of an obtained latent heat storage gypsum plate was performed according to JIS A 6901 (2014). Here, evaluation was performed with the latent heat storage layer side being set as a back face.

As a result of the evaluation, the heat generation property grade 1 was evaluated as "A" and the other cases were evaluated as "F". Note that, "A" means pass and "F" means fail. Also, the total amount of heat generation for the heating time; i.e., 20 minutes is presented in the row "Total amount of heat generation, 20-min value".

Note that, the heat generation property grade 1 means satisfying the following judgement criteria with the heating time being set to 20 minutes. Specifically, the judgement criteria are: the total amount of heat generation up to the end of heating time shall be 8 MJ/m$^2$ or less; no generation of fissures, holes, etc. penetrating to the back surface of the test piece that are regarded detrimental to fire protective performance shall be observed within the heating time; and the highest heat generation rate shall not exceed 200 kW/m$^2$ continuously for 10 seconds or more within the heating time.

For the evaluation in the heat generation property test, CONE CALORIMETER (product of Toyo Seiki Seisaku-sho, Ltd., Model No.: C3) was used.

Figure 4:
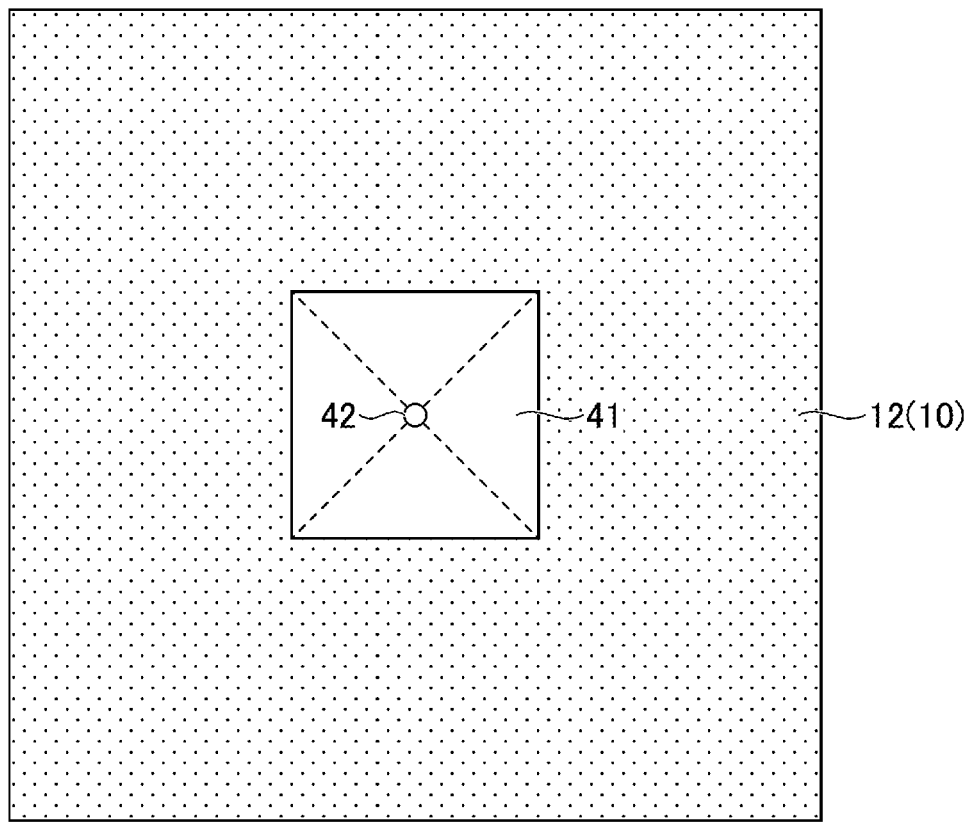
FIG. 4 illustrates a test method for leakage of a latent heat storage material upon being fastened with a screw.

(1-4) Leakage of the Latent Heat Storage Material Upon being Fastened with a Screw As illustrated in FIG. 4, a paraffin paper sheet 41 was disposed on the latent heat storage layer 12 of an obtained latent heat storage gypsum plate 10, and the paraffin paper sheet 41 was fixed with a screw 42 at the center of the paraffin paper sheet 41.

Subsequently, the latent heat storage gypsum plate 10, to which the paraffin paper sheet 41 had been fixed, was heated to a temperature equal to or higher than the melting point of the contained latent heat storage material. Specifically, the latent heat storage gypsum plate 10 was treated in a desiccator of 40° C. until the weight thereof was constant. In other words, the latent heat storage gypsum plate 10 was placed in the desiccator until no change in the weight was observed. Then, the presence or absence of adhesion of the latent heat storage material to the paraffin paper sheet 41 was confirmed.

The case in which the adhesion of the latent heat storage material to the paraffin paper sheet 41 was observed was evaluated as "F", and the case in which the adhesion of the latent heat storage material to the paraffin paper sheet 41 was not observed was evaluated as "A". Note that, "A" means pass and "F" means fail.

In the case in which the adhesion of the latent heat storage material to the paraffin paper sheet 41 is not observed, no leakage of the latent heat storage material occurs, meaning that repeated use is possible with almost no change in, for example, heat storage capacity.

Experimental Example 1

In Experimental Example 1, the latent heat storage gypsum plate as illustrated in FIG. 1 was produced. Note that, in Experimental Example 1, latent heat storage gypsum plates of Experimental Example 1-1 to Experimental Example 1-6 as presented in Table 1 were produced in the same manner except that the composition of the latent heat storage layer was changed.

Production conditions for the latent heat storage gypsum plates will be described.

As the gypsum plate 11, a gypsum board of 12.5 mm thick×300 mm wide×400 mm long was provided. The latent heat storage layer 12 was formed on the entirety of the first main face 11A, thereby producing the latent heat storage gypsum plate 10.

The latent heat storage layer was formed through coating of the latent heat storage material-containing coating material by flow coating, followed by drying. The latent heat storage material-containing coating material had been formed by kneading the latent heat storage material and the binder.

As the latent heat storage material, a material enclosing a fatty acid ester as the latent heat storage substance in a microcapsule made of polyurethane was used.

As the binder, an alkali metal aqueous solution of sodium silicate and lithium silicate; i.e., an alkali metal silicate-based, inorganic binder was used.

As described above, the latent heat storage material-containing coating materials were prepared so that the blending ratio between the latent heat storage material and the binder would be those presented in Table 1 after drying to form the latent heat storage layer. Each of the latent heat storage material-containing coating materials was coated onto the gypsum plate in the above-described manner so that the latent heat storage layer after drying would have a thickness of 3 mm, followed by drying, thereby producing the latent heat storage gypsum plates.

Each of the obtained latent heat storage gypsum plates was evaluated for the above-described heat storage capacity, heat generation property, flowability of the coating material, and leakage of the latent heat storage material upon being fastened with a screw. The results are presented in Table 1.

Note that, Table 1 also presents calculation results of latent heat storage material amounts that are each a mass of the latent heat storage material contained per unit area of the first main face of the gypsum plate 11 in the latent heat storage gypsum plate 10 produced in each Experimental Example.

Experimental Example 1-2 to Experimental Example 1-5 are Working Examples, and Experimental Example 1-1 and Experimental Example 1-6 are Comparative Examples.

When the heat generation property test was performed, it could be confirmed that all of the latent heat storage gypsum plates of Experimental Example 1-2 to Experimental Example 1-5 exhibited the heat generation property grade 1. Note in these Experimental Examples that, in the heat generation property test, no generation of fissures, holes, etc. penetrating to the back surface regarded detrimental to fire protective performance was observed within the heating time, and the highest heat generation rate did not exceed 200 kW/m$^2$ continuously for 10 seconds or more within the heating time.

TABLE 1

|  |  | Experimental Example 1-1 | Experimental Example 1-2 | Experimental Example 1-3 | Experimental Example 1-4 | Experimental Example 1-5 | Experimental Example 1-6 |
|---|---|---|---|---|---|---|---|
| Composition of latent heat storage layer | Latent heat storage material [wt %-dry] | 0 | 13 | 56 | 62 | 69 | 70 |
|  | Binder [wt %-dry] | 100 | 87 | 45 | 38 | 31 | 30 |
| Latent heat storage material amount [g/m$^2$] |  | 0 | 425.4 | 1718.9 | 1487.4 | 1389.5 | — |

TABLE 1-continued

| | Experimental Example 1-1 | Experimental Example 1-2 | Experimental Example 1-3 | Experimental Example 1-4 | Experimental Example 1-5 | Experimental Example 1-6 |
|---|---|---|---|---|---|---|
| Heat storage capacity [kJ/m$^2$] | 255.7 | 321.6 | 403.0 | 406.2 | 372.6 | — |
| Total amount of heat generation, 20-min value [MJ/m$^2$] | 3.90 | 4.69 | 6.57 | 6.26 | 6.08 | — |
| Heat generation property test | A | A | A | A | A | — |
| Flowability of coating material | A | A | A | A | A | F |
| Leakage of latent heat storage material upon being fastened with a screw | — | A | A | A | A | — |

According to the results presented in Table 1, Experimental Example 1-2 to Experimental Example 1-5; i.e., Working Examples exhibit the heat generation property grade 1 and a heat storage capacity of 260 KJ/m$^2$ or more. Thus, the ability to produce the latent heat storage gypsum plates having incombustibility and excellent heat storage capacity was confirmed.

Note that, it could be confirmed that Experimental Example 1-4 and Experimental Example 1-5, in which the content ratio of the latent heat storage material in the intended composition of the latent heat storage layer is higher than that in Experimental Example 1-3, tended to decrease in heat storage capacity as compared with Experimental Example 1-3. A conceivable reason for this is as follows. Specifically, the latent heat storage material-containing coating material during being formed became thicker in accordance with increasing of the content ratio of the latent heat storage material, and more easily included air. As a result, the actual content of the latent heat storage material in the formed latent heat storage layer was lower than the intended composition.

Also, even when the latent heat storage gypsum plate was heated, no leakage of the latent heat storage material was found. Thus, it could be recognized that the latent heat storage gypsum plate would exhibit stable heat storage capacity even in repeated use.

In Experimental Example 1-1, no latent heat storage material was added to the latent heat storage layer, and thus the achieved heat storage capacity was not sufficient. In Experimental Example 1-6, the flowability of the latent heat storage material-containing coating material was not sufficient. Thus, production of the latent heat storage gypsum plate was stopped, and evaluation for, for example, heat storage capacity was not performed.

Experimental Example 2

In Experimental Example 2, the latent heat storage gypsum plate as illustrated in FIG. 1 was produced. Note that, in Experimental Example 2, latent heat storage gypsum plates of Experimental Example 2-1 to Experimental Example 2-6 as presented in Table 2 were produced in the same manner except that the composition of the latent heat storage layer was changed.

Production conditions for the latent heat storage gypsum plates will be described.

As the gypsum plate 11, a gypsum board of 12.5 mm thick×300 mm wide×400 mm long was provided. The latent heat storage layer 12 was formed on the entirety of the first main face 11A, thereby producing the latent heat storage gypsum plate 10.

The latent heat storage layer was formed through coating of the latent heat storage material-containing coating material by flow coating, followed by drying. The latent heat storage material-containing coating material had been formed by kneading the latent heat storage material and the binder.

As the latent heat storage material, a material enclosing a fatty acid ester as the latent heat storage substance in a microcapsule made of polyurethane was used.

As the binder, a vinyl acetate-based binder was used. Specifically, a binder containing water as a solvent, and the binder active ingredient at a mass ratio of 55.0% was used. That is, an organic binder was used.

As described above, the latent heat storage material-containing coating materials were prepared so that the blending ratio between the latent heat storage material and the binder would be those presented in Table 2 after drying to form the latent heat storage layer. Each of the latent heat storage material-containing coating materials was coated onto the gypsum plate in the above-described manner so that the latent heat storage layer after drying would have a thickness of 3 mm, followed by drying, thereby producing the latent heat storage gypsum plates.

Each of the obtained latent heat storage gypsum plates was evaluated for the above-described heat storage capacity, heat generation property, flowability of the coating material, and leakage of the latent heat storage material upon being fastened with a screw. The results are presented in Table 2.

Note that, Table 2 also presents calculation results of latent heat storage material amounts that are each a mass of the latent heat storage material contained per unit area of the first main face of the gypsum plate 11 in the latent heat storage gypsum plate 10 produced in each Experimental Example.

Experimental Example 2-2 to Experimental Example 2-5 are Working Examples, and Experimental Example 2-1 and Experimental Example 2-6 are Comparative Examples.

When the heat generation property test was performed, it could be confirmed that all of the latent heat storage gypsum plates of Experimental Example 2-2 to Experimental Example 2-5 exhibited the heat generation property grade 1. Note in these Experimental Examples that, in the heat generation property test, no generation of fissures, holes, etc. penetrating to the back surface regarded detrimental to fire protective performance was observed within the heating time, and the highest heat generation rate did not exceed 200 kW/m² continuously for 10 seconds or more within the heating time.

3-1-1 to Comparative Example Mar. 1, 2027), the latent heat storage gypsum plate as illustrated in FIG. 1 was produced.

TABLE 2

|  |  | Experimental Example 2-2 | Experimental Example 2-2 | Experimental Example 2-3 | Experimental Example 2-4 | Experimental Example 2-5 | Experimental Example 2-6 |
|---|---|---|---|---|---|---|---|
| Composition of latent heat storage layer | Latent heat storage material [wt %-dry] | 0 | 18 | 65 | 71 | 78 | 80 |
|  | Binder [wt %-dry] | 100 | 32 | 35 | 29 | 22 | 20 |
| Latent heat storage material amount [g/m²] |  | 0 | 530.9 | 1910.3 | 1629.2 | 1500.6 | — |
| Heat storage capacity [kJ/m²] |  | 257.6 | 320.9 | 423.0 | 412.5 | 392.5 | — |
| Total amount of heat generation, 20-min value [MJ/m²] |  | 4.33 | 5.03 | 6.68 | 6.44 | 6.40 | — |
| Heat generation property test |  | A | A | A | A | A | — |
| Flowability of coating material |  | A | A | A | A | A | F |
| Leakage of latent heat storage material upon being fastened with a screw |  | — | A | A | A | A | — |

According to the results presented in Table 2, Experimental Example 2-2 to Experimental Example 2-5; i.e., Working Examples exhibit the heat generation property grade 1 and a heat storage capacity of 260 KJ/m² or more. Thus, the ability to produce the latent heat storage gypsum plates having incombustibility and excellent heat storage capacity was confirmed.

Note that, it could be confirmed that Experimental Example 2-4 and Experimental Example 2-5, in which the content ratio of the latent heat storage material in the intended composition of the latent heat storage layer is higher than that in Experimental Example 2-3, tended to decrease in heat storage capacity as compared with Experimental Example 2-3. A conceivable reason for this is as follows. Specifically, the latent heat storage material-containing coating material during being formed became thicker in accordance with increasing of the content ratio of the latent heat storage material, and more easily included air. As a result, the actual content of the latent heat storage material in the formed latent heat storage layer was lower than the intended composition.

Also, even when the latent heat storage gypsum plate was heated, no leakage of the latent heat storage material was found. Thus, it could be recognized that the latent heat storage gypsum plate would exhibit stable heat storage capacity even in repeated use.

In Experimental Example 2-1, no latent heat storage material was added to the latent heat storage layer, and thus the achieved heat storage capacity was not sufficient. In Experimental Example 2-6, the flowability of the latent heat storage material-containing coating material was not sufficient. Thus, production of the latent heat storage gypsum plate was stopped, and evaluation for, for example, heat storage capacity was not performed.

Experimental Example 3

(1) Experimental Example 3-1

In Experimental Example 3-1 (Working Example 3-1-1 to Working Example Mar. 1, 2024 and Comparative Example Note that, in Experimental Example 3-1, in order to study the relation of thickness X (mm) of the gypsum plate 11, specific gravity Y (–) of the gypsum plate 11, and heat storage capacity Z (KJ/m²), the latent heat storage gypsum plates were produced by changing the kind of the gypsum plate and the latent heat storage material amount, followed by evaluation.

Note that, the thickness X of the gypsum plate 11 and the specific gravity Y of the gypsum plate 11 were measured according to JIS A 6901 (2014).

Production conditions for the latent heat storage gypsum plates will be described.

As the gypsum plate 11, gypsum boards having thicknesses and specific gravities as presented in Table 3 to Table 6 were provided for each Experimental Example. The latent heat storage layer 12 was formed on the entirety of the first main face 11A, thereby producing the latent heat storage gypsum plate 10.

The latent heat storage layer was formed through coating of the latent heat storage material-containing coating material by flow coating, followed by drying. The latent heat storage material-containing coating material had been formed by kneading the latent heat storage material, the binder, and talc.

As the latent heat storage material, a material enclosing a fatty acid ester as the latent heat storage substance in a microcapsule made of polyurethane was used.

As the binder, a vinyl acetate-based binder was used. Specifically, a binder containing water as a solvent, and the binder active ingredient at a mass ratio of 55.0% was used. That is, an organic binder was used.

Also, the talc was added to the latent heat storage material-containing coating material so that the talc would be contained by 2.9 parts by mass, with the latent heat storage layer being 100 parts by mass.

The concentration of the latent heat storage material-containing coating material used in Experimental Example 3-1 was made constant. The latent heat storage material-containing coating material was coated on the gypsum plate 11 by adjusting the thickness of the latent heat storage layer so that the latent heat storage material amount of the coated latent heat storage layer would be any of the values as presented in Table 3 to Table 6 for each of Working Examples and Comparative Examples.

Note that, the latent heat storage material-containing coating material was prepared so that the latent heat storage layer would contain the latent heat storage material by 64.8 mass %, the binder by 32.3 mass %, and the talc by 2.9 mass %. Also, the latent heat storage material amount is a mass of the latent heat storage material contained per unit area of the first main face 11A of the gypsum plate 11.

Each of the obtained latent heat storage gypsum plates was evaluated for the above-described heat storage capacity and heat generation property. The results are presented in Table 3 to Table 6. Note in Working Example 3-1-1 to Working Example Mar. 1, 2024 that, in the heat generation property test, no generation of fissures, holes, etc. penetrating to the back surface regarded detrimental to fire protective performance was observed within the heating time, and the highest heat generation rate did not exceed 200 kW/m² continuously for 10 seconds or more within the heating time.

TABLE 3

| | Working Example 3-1-1 | Working Example 3-1-2 | Working Example 3-1-3 | Working Example 3-1-4 | Working Example 3-1-5 | Working Example 3-1-6 | Working Example 3-1-7 |
|---|---|---|---|---|---|---|---|
| Thickness (X) [mm] | 9.02 | 9.00 | 9.03 | 9.02 | 9.73 | 9.73 | 9.71 |
| Specific gravity (Y) [—] | 0.921 | 0.997 | 1.197 | 1.428 | 0.823 | 0.999 | 1.200 |
| Latent heat storage material amount [g/m²] | 716.7 | 1202.5 | 2416.9 | 3813.5 | 735.9 | 1807.2 | 2997.4 |
| Heat storage capacity (Z) [kJ/m²] | 264.1 | 332.1 | 520.6 | 729.8 | 260.0 | 426.3 | 607.4 |
| Total amount of heat generation, 28-min value [MJ/m²] | 7.05 | 7.17 | 6.81 | 6.90 | 7.40 | 7.48 | 6.92 |
| Heat generation property test | A | A | A | A | A | A | A |

| | Working Example 3-1-8 | Working Example 3-1-9 | Working Example 3-1-10 | Working Example 3-1-11 | Working Example 3-1-12 | Working Example 3-1-13 |
|---|---|---|---|---|---|---|
| Thickness (X) [mm] | 9.72 | 11.00 | 11.01 | 11.00 | 10.99 | 11.02 |
| Specific gravity (Y) [—] | 1.429 | 0.651 | 0.822 | 1.001 | 1.201 | 1.429 |
| Latent heat storage material amount [g/m²] | 4366.3 | 925.6 | 1899.3 | 2930.2 | 4075.6 | 5392.9 |
| Heat storage capacity (Z) [kJ/m²] | 821.9 | 262.5 | 422.6 | 588.8 | 768.6 | 979.9 |
| Total amount of heat generation, 28-min value [MJ/m²] | 7.19 | 7.06 | 7.61 | 7.80 | 7.45 | 6.82 |
| Heat generation property test | A | A | A | A | A | A |

TABLE 4

|  | Working Example 3-1-14 | Working Example 3-1-15 | Working Example 3-1-16 | Working Example 3-1-17 | Working Example 3-1-18 | Working Example 3-1-19 | Working Example 3-1-20 | Working Example 3-1-21 | Working Example 3-1-22 | Working Example 3-1-23 | Working Example 3-1-24 |
| --- | --- | --- | --- | --- | --- | --- | --- | --- | --- | --- | --- |
| Thickness (X) [mm] | 12.10 | 12.15 | 12.09 | 12.15 | 12.07 | 12.52 | 12.47 | 12.49 | 12.48 | 12.51 | 14.98 |
| Specific gravity (Y) [—] | 0.501 | 0.667 | 1.003 | 1.200 | 1.428 | 0.443 | 0.672 | 1.003 | 1.203 | 1.430 | 0.351 |
| Latent heat storage material amount [g/m$^2$] | 1111.6 | 2053.0 | 3830.4 | 4987.9 | 6261.5 | 1163.5 | 2421.3 | 4225.9 | 5319.6 | 6577.4 | 3075.1 |
| Heat storage capacity (Z) [kJ/m$^2$] | 263.1 | 421.6 | 719.1 | 912.9 | 1109.5 | 260.8 | 463.6 | 775.7 | 954.9 | 1178.2 | 487.1 |
| Total amount of heat generation, 20-min value [MJ/m$^2$] | 7.30 | 7.97 | 7.75 | 7.17 | 7.51 | 7.53 | 7.03 | 7.66 | 7.53 | 6.98 | 3.56 |
| Heat generation property test | A | A | A | A | A | A | A | A | A | A | A |

TABLE 5

|  | Comp. Ex. 3-1-1 | Comp. Ex. 3-1-2 | Comp. Ex. 3-1-3 | Comp. Ex. 3-1-4 | Comp. Ex. 3-1-5 | Comp. Ex. 3-1-6 | Comp. Ex. 3-1-7 | Comp. Ex. 3-1-8 | Comp. Ex. 3-1-9 | Comp. Ex. 3-1-10 | Comp. Ex. 3-1-11 | Comp. Ex. 3-1-12 | Comp. Ex. 3-1-13 |
| --- | --- | --- | --- | --- | --- | --- | --- | --- | --- | --- | --- | --- | --- |
| Thickness (X) [mm] | 9.01 | 9.03 | 9.02 | 9.01 | 9.73 | 9.68 | 9.73 | 9.69 | 11.02 | 11.00 | 10.57 | 11.01 | 11.03 |
| Specific gravity (Y) [—] | 0.922 | 1.003 | 1.203 | 1.429 | 0.818 | 1.003 | 1.203 | 1.430 | 0.653 | 0.818 | 1.002 | 1.200 | 1.430 |
| Latent heat storage material amount [g/m$^2$] | 745.4 | 1250.6 | 2513.6 | 3966.0 | 1765.3 | 1979.5 | 3117.3 | 4540.9 | 962.6 | 1975.2 | 3047.4 | 4238.6 | 5608.6 |
| Heat storage capacity (Z) [kJ/m$^2$] | 266.8 | 344.3 | 536.4 | 756.4 | 262.0 | 434.9 | 628.1 | 847.3 | 270.0 | 431.6 | 604.5 | 796.8 | 1018.0 |
| Total amount of heat generation, 20-min value [MJ/m$^2$] | 8.91 | 8.51 | 8.65 | 6.51 | 8.29 | 8.30 | 8.55 | 8.46 | 6.24 | 3.15 | 6.83 | 3.48 | 6.48 |
| Heat generation property test | F | F | F | F | F | F | F | F | F | F | F | F | F |

TABLE 6

|  | Comp. Ex. 3-1-14 | Comp. Ex. 3-1-15 | Comp. Ex. 3-1-16 | Comp. Ex. 3-1-17 | Comp. Ex. 3-1-18 | Comp. Ex. 3-1-19 | Comp. Ex. 3-1-20 | Comp. Ex. 3-1-21 | Comp. Ex. 3-1-22 | Comp. Ex. 3-1-23 | Comp. Ex. 3-1-24 | Comp. Ex. 3-1-25 | Comp. Ex. 3-1-26 | Comp. Ex. 3-1-27 |
| --- | --- | --- | --- | --- | --- | --- | --- | --- | --- | --- | --- | --- | --- | --- |
| Thickness (X) [mm] | 12.11 | 12.13 | 12.09 | 12.11 | 12.10 | 12.52 | 14.46 | 12.49 | 12.53 | 12.45 | 8.91 | 8.93 | 8.88 | 9.93 |

TABLE 6-continued

| | Comp. Ex. 3-1-14 | Comp. Ex. 3-1-15 | Comp. Ex. 3-1-16 | Comp. Ex. 3-1-17 | Comp. Ex. 3-1-18 | Comp. Ex. 3-1-19 | Comp. Ex. 3-1-20 | Comp. Ex. 3-1-21 | Comp. Ex. 3-1-22 | Comp. Ex. 3-1-23 | Comp. Ex. 3-1-24 | Comp. Ex. 3-1-25 | Comp. Ex. 3-1-26 | Comp. Ex. 3-1-27 |
|---|---|---|---|---|---|---|---|---|---|---|---|---|---|---|
| Specific gravity (Y) [—] | 0.496 | 0.671 | 0.998 | 1.203 | 1.427 | 0.443 | 0.668 | 0.999 | 1.198 | 1.427 | 0.920 | 0.997 | 1.202 | 1.428 |
| Latent heat storage material amount [g/m$^2$] | 1156.1 | 2135.1 | 4035.6 | 5187.4 | 6512.0 | 1210.1 | 2519.2 | 4395.0 | 5532.4 | 6840.5 | 716.6 | 1202.5 | 2416.8 | 3813.4 |
| Heat storage capacity (Z) [kJ/m$^2$] | 269.1 | 433.0 | 747.8 | 941.2 | 1159.8 | 263.6 | 433.7 | 600.4 | 991.1 | 1210.4 | 260.8 | 335.2 | 521.0 | 737.6 |
| Total amount of heat generation, 20-min value [MJ/m$^2$] | 9.17 | 8.67 | 8.99 | 8.53 | 8.71 | 8.98 | 8.17 | 8.05 | 8.57 | 8.94 | 8.11 | 8.30 | 9.18 | 9.88 |
| Heat generation property test | F | F | F | F | F | F | F | F | F | F | F | F | F | F |

(2) Experimental Example 3-2

In Experimental Example 3-2 (Working Example 3-2-1 to Working Example Mar. 2, 2024 and Comparative Example 3-2-1 to Comparative Example Mar. 2, 2027), the latent heat storage gypsum plate as illustrated in FIG. 1 was produced.

Note that, in Experimental Example 3-2, in order to study the relation of thickness X (mm) of the gypsum plate 11, specific gravity Y (–) of the gypsum plate 11, and heat storage capacity Z (KJ/m$^2$), the latent heat storage gypsum plates were produced by changing the kind of the gypsum plate and the latent heat storage material amount, followed by evaluation.

Note that, the thickness X of the gypsum plate 11 and the specific gravity Y of the gypsum plate 11 were measured according to JIS A 6901 (2014).

Production conditions for the latent heat storage gypsum plates will be described.

As the gypsum plate 11, gypsum boards having thicknesses and specific gravities as presented in Table 7 to Table 10 were provided for each Experimental Example. The latent heat storage layer 12 was formed on the entirety of the first main face 11A, thereby producing the latent heat storage gypsum plate 10.

The latent heat storage layer was formed through coating of the latent heat storage material-containing coating material by flow coating, followed by drying. The latent heat storage material-containing coating material had been formed by kneading the latent heat storage material and the binder.

As the latent heat storage material, a material enclosing a fatty acid ester as the latent heat storage substance in a microcapsule made of polyurethane was used.

As the binder, a vinyl acetate-based binder was used. Specifically, a binder containing water as a solvent, and the binder active ingredient at a mass ratio of 55.0% was used. That is, an organic binder was used.

The concentration of the latent heat storage material-containing coating material used in Experimental Example 3-2 was made constant. The latent heat storage material-containing coating material was coated on the gypsum plate 11 by adjusting the thickness of the latent heat storage layer so that the latent heat storage material amount of the coated latent heat storage layer would be any of the values as presented in Table 7 to Table 10 for each of Working Examples and Comparative Examples.

Note that, the latent heat storage material-containing coating material was prepared so that the heat storage material by 64.8 mass % and the binder by 35.2 mass %. Also, the latent heat storage material amount is a mass of the latent heat storage material contained per unit area of the first main face 11A of the gypsum plate 11.

Each of the obtained latent heat storage gypsum plates was evaluated for the above-described heat storage capacity and heat generation property. The results are presented in Table 7 to Table 10. Note in Working Example 3-2-1 to Working Example Mar. 2, 2024 that, in the heat generation property test, no generation of fissures, holes, etc. penetrating to the back surface regarded detrimental to fire protective performance was observed within the heating time, and the highest heat generation rate did not exceed 200 kW/m$^2$ continuously for 10 seconds or more within the heating time.

TABLE 7

| | Working Example 3-2-1 | Working Example 3-2-2 | Working Example 3-2-3 | Working Example 3-2-4 | Working Example 3-2-5 | Working Example 3-2-6 | Working Example 3-2-7 |
|---|---|---|---|---|---|---|---|
| Thickness (X) [mm] | 9.03 | 9.00 | 9.00 | 9.00 | 9.73 | 9.73 | 9.73 |

TABLE 7-continued

|  | | | | | | | |
|---|---|---|---|---|---|---|---|
| Specific gravity (Y) [—] | 0.920 | 1.003 | 1.000 | 1.427 | 3.823 | 0.997 | 1.197 |
| Latent heat storage material amount [g/m²] | 716.0 | 1203.7 | 2419.3 | 3813.5 | 738.6 | 1807.2 | 2994.4 |
| Heat storage capacity (Z) [kJ/m²] | 263.1 | 337.0 | 515.4 | 724.1 | 261.6 | 421.1 | 604.7 |
| Total amount of heat generation, 20-min value [MJ/m²] | 7.78 | 7.66 | 7.54 | 7.76 | 7.33 | 7.86 | 7.53 |
| Heat generation property test | A | A | A | A | A | A | A |

|  | Working Example 3-2-8 | Working Example 3-2-9 | Working Example 3-2-10 | Working Example 3-2-11 | Working Example 3-2-12 | Working Example 3-2-13 |
|---|---|---|---|---|---|---|
| Thickness (X) [mm] | 9.70 | 11.03 | 11.01 | 11.00 | 11.03 | 11.00 |
| Specific gravity (Y) [—] | 1.430 | 0.650 | 0.820 | 1.000 | 1.200 | 1.430 |
| Latent heat storage material amount [g/m²] | 4366.3 | 926.5 | 1897.4 | 2927.2 | 4075.6 | 5398.3 |
| Heat storage capacity (Z) [kJ/m²] | 820.3 | 264.3 | 418.2 | 586.1 | 775.1 | 981.3 |
| Total amount of heat generation, 20-min value [MJ/m²] | 7.27 | 7.71 | 7.19 | 7.61 | 7.94 | 7.88 |
| Heat generation property test | A | A | A | A | A | A |

TABLE 8

|  | Working Example 3-2-14 | Working Example 3-2-15 | Working Example 3-2-16 | Working Example 3-2-17 | Working Example 3-2-18 | Working Example 3-2-19 | Working Example 3-2-20 | Working Example 3-2-21 | Working Example 3-2-22 | Working Example 3-2-23 | Working Example 3-2-24 |
|---|---|---|---|---|---|---|---|---|---|---|---|
| Thickness (X) [mm] | 12.08 | 12.11 | 12.10 | 12.10 | 12.10 | 12.52 | 12.48 | 12.51 | 12.48 | 12.50 | 14.98 |
| Specific gravity (Y) [—] | 0.502 | 0.672 | 1.000 | 1.200 | 1.427 | 0.443 | 0.668 | 1.000 | 1.198 | 1.430 | 0.353 |
| Latent heat storage material amount [g/m²] | 1112.7 | 2053.0 | 3884.3 | 4992.9 | 6267.8 | 1363.5 | 2423.7 | 4230.2 | 5314.3 | 6584.0 | 3097.1 |
| Heat storage | 260.7 | 419.5 | 719.0 | 908.4 | 1116.8 | 262.4 | 464.9 | 772.6 | 955.1 | 1176.9 | 490.5 |

TABLE 8-continued

|  | Working Example 3-2-14 | Working Example 3-2-15 | Working Example 3-2-16 | Working Example 3-2-17 | Working Example 3-2-18 | Working Example 3-2-19 | Working Example 3-2-20 | Working Example 3-2-21 | Working Example 3-2-22 | Working Example 3-2-23 | Working Example 3-2-24 |
|---|---|---|---|---|---|---|---|---|---|---|---|
| capacity (Z) [kJ/m$^2$] |  |  |  |  |  |  |  |  |  |  |  |
| Total amount of heat generation, 20-min value [MJ/m$^2$] | 7.31 | 7.07 | 7.02 | 7.19 | 7.75 | 7.59 | 7.34 | 7.70 | 7.86 | 7.77 | 3.60 |
| Heat generation property test | A | A | A | A | A | A | A | A | A | A | A |

TABLE 9

|  | Comp. Ex. 3-2-1 | Comp. Ex. 3-2-2 | Comp. Ex. 3-2-3 | Comp. Ex. 3-2-4 | Comp. Ex. 3-2-5 | Comp. Ex. 3-2-6 | Comp. Ex. 3-2-7 | Comp. Ex. 3-2-8 | Comp. Ex. 3-2-9 | Comp. Ex. 3-2-10 | Comp. Ex. 3-2-11 | Comp. Ex. 3-0-12 | Comp. Ex. 3-2-13 |
|---|---|---|---|---|---|---|---|---|---|---|---|---|---|
| Thickness (X) [mm] | 9.00 | 9.01 | 9.00 | 9.00 | 9.67 | 9.67 | 9.68 | 9.70 | 11.03 | 10.97 | 10.99 | 10.97 | 10.97 |
| Specific gravity (Y) [—] | 0.923 | 1.001 | 1.199 | 1.430 | 0.821 | 0.999 | 1.197 | 1.429 | 0.651 | 0.818 | 1.000 | 1.203 | 1.427 |
| Latent heat storage material amount [g/m$^2$] | 746.1 | 1251.6 | 2513.6 | 3966.0 | 766.1 | 1877.6 | 3120.5 | 4545.5 | 962.6 | 1973.2 | 3050.4 | 4238.6 | 5603.0 |
| Heat storage capacity (Z) [kJ/m$^2$] | 266.9 | 343.7 | 535.1 | 756.3 | 261.6 | 433.6 | 626.0 | 347.9 | 269.7 | 430.8 | 604.9 | 796.4 | 1014.8 |
| Total amount of heat generation, 20-min value [MJ/m$^2$] | 8.72 | 8.51 | 8.10 | 8.58 | 9.14 | 8.88 | 8.01 | 8.95 | 8.70 | 8.66 | 8.56 | 8.53 | 8.01 |
| Heat generation property test | F | F | F | F | F | F | F | F | F | F | F | F | F |

TABLE 10

|  | Comp. Ex. 3-2-14 | Comp. Ex. 3-2-15 | Comp. Ex. 3-2-16 | Comp. Ex. 3-2-17 | Comp. Ex. 3-2-18 | Comp. Ex. 3-2-19 | Comp. Ex. 3-2-20 | Comp. Ex. 3-2-21 | Comp. Ex. 3-2-22 | Comp. Ex. 3-2-23 | Comp. Ex. 3-2-24 | Comp. Ex. 3-2-25 | Comp. Ex. 3-2-26 | Comp. Ex. 3-2-27 |
|---|---|---|---|---|---|---|---|---|---|---|---|---|---|---|
| Thickness (X) [mm] | 12.09 | 12.07 | 12.13 | 12.11 | 12.07 | 12.53 | 12.47 | 12.48 | 12.52 | 12.49 | 8.88 | 8.90 | 8.89 | 8.87 |
| Specific gravity (Y) [—] | 0.498 | 0.667 | 1.003 | 1.197 | 1.430 | 0.442 | 0.667 | 1.003 | 1.200 | 1.430 | 0.921 | 1.003 | 1.202 | 1.430 |
| Latent heat storage material amount [g/m$^2$] | 1156.1 | 2137.3 | 4035.6 | 5187.4 | 6505.5 | 1210.1 | 2518.2 | 4399.4 | 5532.4 | 6840.5 | 717.3 | 1203.7 | 2416.8 | 3813.4 |

TABLE 10-continued

|  | Comp. Ex. 3-2-14 | Comp. Ex. 3-2-15 | Comp. Ex. 3-2-16 | Comp. Ex. 3-2-17 | Comp. Ex. 3-2-18 | Comp. Ex. 3-2-19 | Comp. Ex. 3-2-20 | Comp. Ex. 3-2-21 | Comp. Ex. 3-2-22 | Comp. Ex. 3-2-23 | Comp. Ex. 3-2-24 | Comp. Ex. 3-2-25 | Comp. Ex. 3-2-26 | Comp. Ex. 3-2-27 |
|---|---|---|---|---|---|---|---|---|---|---|---|---|---|---|
| Heat storage capacity (Z) [kJ/m$^2$] | 286.9 | 431.4 | 750.0 | 959.7 | 1158.9 | 263.8 | 483.6 | 801.8 | 991.7 | 1212.4 | 260.5 | 334.8 | 521.0 | 737.6 |
| Total amount of heat generation, 20-min value [MJ/m$^2$] | 8.57 | 3.73 | 8.80 | 8.89 | 8.92 | 8.88 | 8.56 | 8.92 | 8.93 | 8.27 | 8.49 | 8.40 | 9.13 | 8.93 |
| Heat generation property test | F | F | F | F | F | F | F | F | F | F | F | F | F | F |

(3) Experimental Example 3-3

In Experimental Example 3-3 (Working Example 3-3-1 to Working Example Mar. 3, 2024 and Comparative Example 3-3-1 to Comparative Example Mar. 3, 2027), the latent heat storage gypsum plate as illustrated in FIG. 1 was produced.

Note that, in Experimental Example 3-3, in order to study the relation of thickness X (mm) of the gypsum plate 11, specific gravity Y (−) of the gypsum plate 11, and heat storage capacity Z (kJ/m$^2$), the latent heat storage gypsum plates were produced by changing the kind of the gypsum plate and the latent heat storage material amount, followed by evaluation.

Note that, the thickness X of the gypsum plate 11 and the specific gravity Y of the gypsum plate 11 were measured according to JIS A 6901 (2014).

Production conditions for the latent heat storage gypsum plates will be described.

As the gypsum plate 11, gypsum boards having thicknesses and specific gravities as presented in Table 11 to Table 14 were provided for each Experimental Example. The latent heat storage layer 12 was formed on the entirety of the first main face 11A, thereby producing the latent heat storage gypsum plate 10.

The latent heat storage layer was formed through coating of the latent heat storage material-containing coating material by flow coating, followed by drying. The latent heat storage material-containing coating material had been formed by kneading the latent heat storage material and the binder.

As the latent heat storage material, a material enclosing paraffin as the latent heat storage substance in a microcapsule made of a melamine resin was used.

As the binder, a vinyl acetate-based binder was used. Specifically, a binder containing water as a solvent, and the binder active ingredient at a mass ratio of 55.0% was used. That is, an organic binder was used.

The concentration of the latent heat storage material-containing coating material used in Experimental Example 3-3 was made constant. The latent heat storage material-containing coating material was coated on the gypsum plate 11 by adjusting the thickness of the latent heat storage layer so that the latent heat storage material amount of the coated latent heat storage layer would be any of the values as presented in Table 11 to Table 14 for each of Working Examples and Comparative Examples.

Note that, the latent heat storage material-containing coating material was prepared so that the heat storage material by 64.8 mass % and the binder by 35.2 mass %. Also, the latent heat storage material amount is a mass of the latent heat storage material contained per unit area of the first main face 11A of the gypsum plate 11.

Each of the obtained latent heat storage gypsum plates was evaluated for the above-described heat storage capacity and heat generation property. The results are presented in Table 11 to Table 14. Note in Working Example 3-3-1 to Working Example Mar. 3, 2024 that, in the heat generation property test, no generation of fissures, holes, etc. penetrating to the back surface regarded detrimental to fire protective performance was observed within the heating time, and the highest heat generation rate did not exceed 200 kW/m$^2$ continuously for 10 seconds or more within the heating time.

TABLE 11

|  | Working Example 3-3-1 | Working Example 3-3-2 | Working Example 3-3-3 | Working Example 3-3-4 | Working Example 3-3-5 | Working Example 3-3-6 | Working Example 3-3-7 |
|---|---|---|---|---|---|---|---|
| Thickness (X) [mm] | 9.02 | 9.03 | 9.02 | 9.03 | 9.72 | 9.72 | 9.72 |
| Specific gravity (Y) [—] | 0.918 | 0.997 | 1.203 | 1.428 | 0.823 | 0.998 | 1.199 |
| Latent heat storage material amount [g/m$^2$] | 717.4 | 1202.5 | 2416.9 | 3817.3 | 735.2 | 1809.0 | 2997.4 |

TABLE 11-continued

|  |  |  |  |  |  |  |  |
|---|---|---|---|---|---|---|---|
| Heat storage capacity (Z) [kJ/m²] | 260.8 | 332.2 | 520.2 | 736.2 | 260.1 | 419.9 | 605.6 |
| Total amount of heat generation, 20-min value [MJ/m²] | 8.90 | 7.12 | 7.56 | 6.82 | 7.92 | 7.83 | 7.08 |
| Heat generation property test | A | A | A | A | A | A | A |

|  | Working Example 3-3-8 | Working Example 3-3-9 | Working Example 3-3-10 | Working Example 3-3-11 | Working Example 3-3-12 | Working Example 3-3-13 |
|---|---|---|---|---|---|---|
| Thickness (X) [mm] | 9.67 | 11.01 | 10.98 | 10.97 | 11.02 | 11.01 |
| Specific gravity (Y) [—] | 1.430 | 0.647 | 0.822 | 0.997 | 1.201 | 1.429 |
| Latent heat storage material amount [g/m²] | 4370.6 | 924.7 | 1901.2 | 2933.1 | 4079.7 | 5392.9 |
| Heat storage capacity (Z) [kJ/m²] | 816.5 | 260.3 | 418.8 | 576.1 | 774.7 | 983.6 |
| Total amount of heat generation, 20-min value [MJ/m²] | 6.84 | 7.40 | 7.42 | 6.94 | 7.51 | 7.74 |
| Heat generation property test | A | A | A | A | A | A |

TABLE 12

|  | Working Example 3-3-14 | Working Example 3-3-15 | Working Example 3-3-16 | Working Example 3-3-17 | Working Example 3-3-18 | Working Example 3-3-19 | Working Example 3-3-20 | Working Example 3-3-21 | Working Example 3-3-22 | Working Example 3-3-23 | Working Example 3-3-24 |
|---|---|---|---|---|---|---|---|---|---|---|---|
| Thickness (X) [mm] | 12.12 | 12.09 | 12.10 | 12.12 | 12.12 | 12.52 | 12.48 | 12.47 | 12.49 | 10.52 | 15.00 |
| Specific gravity (Y) [—] | 0.499 | 0.670 | 1.002 | 1.201 | 1.427 | 0.443 | 0.667 | 0.999 | 1.198 | 1.427 | 0.351 |
| Latent heat storage material amount [g/m²] | 1110.5 | 2053.0 | 3876.5 | 4992.9 | 6255.3 | 1164.7 | 2423.7 | 4230.2 | 5325.0 | 6570.8 | 3062.4 |
| Heat storage capacity (Z) [kJ/m²] | 263.8 | 417.6 | 726.7 | 908.0 | 1111.4 | 262.1 | 463.5 | 770.6 | 949.6 | 1175.5 | 485.7 |
| Total amount of heat generation, 20- | 7.75 | 7.73 | 7.85 | 7.35 | 7.61 | 7.34 | 7.70 | 7.84 | 7.93 | 7.13 | 3.51 |

TABLE 12-continued

|  | Working Example 3-3-14 | Working Example 3-3-15 | Working Example 3-3-16 | Working Example 3-3-17 | Working Example 3-3-18 | Working Example 3-3-19 | Working Example 3-3-20 | Working Example 3-3-21 | Working Example 3-3-22 | Working Example 3-3-23 | Working Example 3-3-24 |
|---|---|---|---|---|---|---|---|---|---|---|---|
| min value [MJ/m$^2$] |  |  |  |  |  |  |  |  |  |  |  |
| Heat generation property test | A | A | A | A | A | A | A | A | A | A | A |

TABLE 13

|  | Comp. Ex. 3-3-1 | Comp. Ex. 3-3-2 | Comp. Ex. 3-3-3 | Comp. Ex. 3-3-4 | Comp. Ex. 3-3-5 | Comp. Ex. 3-3-6 | Comp. Ex. 3-3-7 | Comp. Ex. 3-3-8 | Comp. Ex. 3-3-9 | Comp. Ex. 3-3-10 | Comp. Ex. 3-3-11 | Comp. Ex. 3-3-12 | Comp. Ex. 3-3-13 |
|---|---|---|---|---|---|---|---|---|---|---|---|---|---|
| Thickness (X) [mm] | 9.02 | 9.00 | 9.01 | 9.03 | 9.67 | 9.69 | 8.69 | 9.73 | 10.99 | 10.99 | 10.98 | 11.03 | 11.00 |
| Specific gravity (Y) [—] | 0.921 | 0.997 | 1.202 | 1.427 | 0.823 | 1.001 | 1.199 | 1.427 | 0.653 | 0.322 | 1.000 | 1.202 | 1.427 |
| Latent heat storage material amount [g/m$^2$] | 746.1 | 1250.6 | 2511.1 | 3986.0 | 764.6 | 1877.6 | 3120.5 | 4536.4 | 962.6 | 1973.2 | 3044.3 | 4234.4 | 5603.0 |
| Heat storage capacity (Z) [kJ/m$^2$] | 266.9 | 342.6 | 535.6 | 756.6 | 261.8 | 434.4 | 626.6 | 847.3 | 269.6 | 432.1 | 603.9 | 797.2 | 1015.7 |
| Total amount of heat generation, 20-min value [MJ/m$^2$] | 8.89 | 8.97 | 8.49 | 8.08 | 8.55 | 8.51 | 8.96 | 8.20 | 9.21 | 8.61 | 8.33 | 8.75 | 9.12 |
| Heat generation property test | F | F | F | F | F | F | F | F | F | F | F | F | F |

TABLE 14

|  | Comp. Ex. 3-3-14 | Comp. Ex. 3-3-15 | Comp. Ex. 3-3-16 | Comp. Ex. 3-3-17 | Comp. Ex. 3-3-18 | Comp. Ex. 3-3-19 | Comp. Ex. 3-3-20 | Comp. Ex. 3-3-21 | Comp. Ex. 3-3-22 | Comp. Ex. 3-3-23 | Comp. Ex. 3-3-24 | Comp. Ex. 3-3-25 | Comp. Ex. 3-3-26 | Comp. Ex. 3-3-27 |
|---|---|---|---|---|---|---|---|---|---|---|---|---|---|---|
| Thickness (X) [mm] | 12.09 | 12.09 | 12.09 | 12.07 | 12.13 | 12.53 | 12.47 | 12.52 | 12.49 | 12.49 | 8.90 | 8.88 | 8.90 | 8.93 |
| Specific gravity (Y) [—] | 0.503 | 0.673 | 0.999 | 1.201 | 1.429 | 0.440 | 0.668 | 0.999 | 1.201 | 1.428 | 0.919 | 0.999 | 1.200 | 1.423 |
| Latent heat storage material amount [g/m$^2$] | 1156.1 | 2137.3 | 4035.6 | 5182.2 | 6518.5 | 1210.1 | 2518.2 | 4395.0 | 5538.0 | 6833.7 | 715.9 | 1203.7 | 2414.4 | 3809.6 |
| Heat storage capacity (Z) [kJ/m$^2$] | 270.1 | 433.2 | 748.1 | 939.0 | 1162.0 | 264.4 | 483.8 | 800.2 | 993.1 | 1211.1 | 260.8 | 335.2 | 521.0 | 736.9 |
| Total amount of heat generation, | 8.07 | 8.47 | 8.48 | 8.51 | 8.08 | 8.84 | 8.62 | 8.80 | 8.76 | 8.63 | 8.22 | 8.93 | 8.15 | 8.45 |

TABLE 14-continued

|  | Comp. Ex. 3-3-14 | Comp. Ex. 3-3-15 | Comp. Ex. 3-3-16 | Comp. Ex. 3-3-17 | Comp. Ex. 3-3-18 | Comp. Ex. 3-3-19 | Comp. Ex. 3-3-20 | Comp. Ex. 3-3-21 | Comp. Ex. 3-3-22 | Comp. Ex. 3-3-23 | Comp. Ex. 3-3-24 | Comp. Ex. 3-3-25 | Comp. Ex. 3-3-26 | Comp. Ex. 3-3-27 |
|---|---|---|---|---|---|---|---|---|---|---|---|---|---|---|
| 20-min value [MJ/m$^2$] Heat generation property test | F | F | F | F | F | F | F | F | F | F | F | F | F | F |

(4) Experimental Example 3-4

In Experimental Example 3-4 (Working Example 3-4-1 to Working Example Mar. 4, 2023 and Comparative Example 3-4-1 to Comparative Example Mar. 4, 2023), the latent heat storage gypsum plate as illustrated in FIG. 1 was produced.

Note that, in Experimental Example 3-4, in order to study the relation of thickness X (mm) of the gypsum plate 11, specific gravity Y (–) of the gypsum plate 11, and heat storage capacity Z (KJ/m$^2$), the latent heat storage gypsum plates were produced by changing the kind of the gypsum plate and the latent heat storage material amount, followed by evaluation.

Note that, the thickness X of the gypsum plate 11 and the specific gravity Y of the gypsum plate 11 were measured according to JIS A 6901 (2014).

Production conditions for the latent heat storage gypsum plates will be described.

As the gypsum plate 11, gypsum boards having thicknesses and specific gravities as presented in Table 15 to Table 18 were provided for each Experimental Example. The latent heat storage layer 12 was formed on the entirety of the first main face 11A, thereby producing the latent heat storage gypsum plate 10.

The latent heat storage layer was formed through coating of the latent heat storage material-containing coating material by flow coating, followed by drying. The latent heat storage material-containing coating material had been formed by kneading the latent heat storage material and the binder.

As the latent heat storage material, a material enclosing a fatty acid ester as the latent heat storage substance in a microcapsule made of polyurethane was used.

As the binder, an alkali metal aqueous solution of sodium silicate and lithium silicate; i.e., an alkali metal silicate-based, inorganic binder was used.

The concentration of the latent heat storage material-containing coating material used in Experimental Example 3-4 was made constant. The latent heat storage material-containing coating material was coated on the gypsum plate 11 by adjusting the thickness of the latent heat storage layer so that the latent heat storage material amount of the coated latent heat storage layer would be any of the values as presented in Table 15 to Table 18 for each of Working Examples and Comparative Examples.

Note that, the latent heat storage material-containing coating material was prepared so that the heat storage material by 54.9 mass % and the binder by 45.1 mass %. Also, the latent heat storage material amount is a mass of the latent heat storage material contained per unit area of the first main face 11A of the gypsum plate 11.

Each of the obtained latent heat storage gypsum plates was evaluated for the above-described heat storage capacity and heat generation property. The results are presented in Table 15 to Table 18. Note in Working Example 3-4-1 to Working Example Mar. 4, 2023 that, in the heat generation property test, no generation of fissures, holes, etc. penetrating to the back surface regarded detrimental to fire protective performance was observed within the heating time, and the highest heat generation rate did not exceed 200 kW/m$^2$ continuously for 10 seconds or more within the heating time.

TABLE 15

|  | Working Example 3-4-1 | Working Example 3-4-2 | Working Example 3-4-3 | Working Example 3-4-4 | Working Example 3-4-5 | Working Example 3-4-6 | Working Example 3-4-7 |
|---|---|---|---|---|---|---|---|
| Thickness (X) [mm] | 9.02 | 9.01 | 9.02 | 9.02 | 9.72 | 9.72 | 9.68 |
| Specific gravity (Y) [—] | 0.919 | 1.003 | 1.197 | 1.427 | 0.822 | 1.003 | 1.198 |
| Latent heat storage material amount [g/m$^2$] | 862.6 | 1189.3 | 2311.8 | 3634.4 | 676.8 | 1782.3 | 2824.1 |
| Heat storage capacity (Z) [kJ/m$^2$] | 262.2 | 337.3 | 518.3 | 753.2 | 260.4 | 428.8 | 604.2 |
| Total amount of heat generation, 20- | 7.34 | 7.26 | 7.10 | 7.12 | 7.16 | 7.23 | 7.78 |

TABLE 15-continued

|  | Working Example 3-4-8 | Working Example 3-4-9 | Working Example 3-4-10 | Working Example 3-4-11 | Working Example 3-4-12 | Working Example 3-4-13 |
| --- | --- | --- | --- | --- | --- | --- |
| min value [MJ/m$^2$] |  |  |  |  |  |  |
| Heat generation property test | A | A | A | A | A | A |

|  | Working Example 3-4-8 | Working Example 3-4-9 | Working Example 3-4-10 | Working Example 3-4-11 | Working Example 3-4-12 | Working Example 3-4-13 |
| --- | --- | --- | --- | --- | --- | --- |
| Thickness (X) [mm] | 9.71 | 11.01 | 11.00 | 11.02 | 10.98 | 10.99 |
| Specific gravity (Y) [—] | 1.428 | 0.649 | 0.618 | 1.002 | 1.201 | 1.427 |
| Latent heat storage material amount [g/m$^2$] | 4141.7 | 898.9 | 1803.0 | 2824.8 | 3932.4 | 5161.7 |
| Heat storage capacity (Z) [kJ/m$^2$] | 820.5 | 261.4 | 418.0 | 585.8 | 768.2 | 976.3 |
| Total amount of heat generation, 20-min value [MJ/m$^2$] | 7.87 | 7.15 | 7.64 | 7.80 | 6.87 | 7.67 |
| Heat generation property test | A | A | A | A | A | A |

TABLE 16

|  | Working Example 3-4-14 | Working Example 3-4-15 | Working Example 3-4-16 | Working Example 3-4-17 | Working Example 3-4-18 | Working Example 3-4-19 | Working Example 3-4-20 | Working Example 3-4-21 | Working Example 3-4-22 | Working Example 3-4-23 |
| --- | --- | --- | --- | --- | --- | --- | --- | --- | --- | --- |
| Thickness (X) [mm] | 12.11 | 12.12 | 12.13 | 12.23 | 12.11 | 12.52 | 12.48 | 12.47 | 12.51 | 12.49 |
| Specific gravity (Y) [—] | 0.500 | 0.672 | 0.999 | 1.198 | 1.428 | 0.442 | 0.668 | 1.000 | 1.200 | 1.428 |
| Latent heat storage material amount [g/m$^2$] | 1024.8 | 2014.7 | 3727.3 | 4838.9 | 6045.6 | 1087.2 | 2276.9 | 4032.5 | 5138.4 | 6261.1 |
| Heat storage capacity (Z) [kJ/m$^2$] | 261.9 | 421.6 | 729.2 | 912.8 | 1120.1 | 261.5 | 465.3 | 763.8 | 960.7 | 1159.7 |
| Total amount of heat generation, 20-min value [MJ/m$^2$] | 7.30 | 7.10 | 6.82 | 7.45 | 7.01 | 7.30 | 6.94 | 7.97 | 3.03 | 6.98 |
| Heat generation property test | A | A | A | A | A | A | A | A | A | A |

TABLE 17

| | Comp. Ex. 3-4-1 | Comp. Ex. 3-4-2 | Comp. Ex. 3-4-3 | Comp. Ex. 3-4-4 | Comp. Ex. 3-4-5 | Comp. Ex. 3-4-6 | Comp. Ex. 3-4-7 | Comp. Ex. 3-4-8 | Comp. Ex. 3-4-9 | Comp. Ex. 3-4-10 | Comp. Ex. 3-4-11 | Comp. Ex. 3-4-12 | Comp. Ex. 3-4-13 |
|---|---|---|---|---|---|---|---|---|---|---|---|---|---|
| Thickness (X) [mm] | 9.01 | 9.03 | 9.03 | 9.03 | 9.69 | 9.68 | 9.72 | 9.71 | 11.01 | 10.98 | 10.97 | 11.02 | 11.01 |
| Specific gravity (Y) [—] | 0.922 | 0.996 | 1.197 | 1.409 | 0.823 | 0.999 | 1.199 | 1.427 | 0.647 | 0.823 | 1.003 | 1.197 | 1.430 |
| Latent heat storage material amount [g/m$^2$] | 1171.5 | 1654.4 | 2872.7 | 4293.0 | 1176.8 | 2226.2 | 3462.4 | 4824.0 | 1344.9 | 2337.2 | 3372.0 | 4538.7 | 5879.9 |
| Heat storage capacity (Z) [kJ/m$^2$] | 323.7 | 399.5 | 591.1 | 614.8 | 317.4 | 485.6 | 683.4 | 901.7 | 320.7 | 436.2 | 658.3 | 851.6 | 1074.7 |
| Total amount of heat generation, 20-min value [MJ/m$^2$] | 8.69 | 8.56 | 8.99 | 8.27 | 9.02 | 8.19 | 8.16 | 8.28 | 9.15 | 8.11 | 8.99 | 8.10 | 8.07 |
| Heat generation property test | F | F | F | F | F | F | F | F | F | F | F | F | F |

TABLE 18

| | Comp. Ex. 3-4-14 | Comp. Ex. 3-4-15 | Comp. Ex. 3-4-16 | Comp. Ex. 3-4-17 | Comp. Ex. 3-4-18 | Comp. Ex. 3-4-19 | Comp. Ex. 3-4-20 | Comp. Ex. 3-4-21 | Comp. Ex. 3-4-22 | Comp. Ex. 3-4-23 |
|---|---|---|---|---|---|---|---|---|---|---|
| Thickness (X) [mm] | 12.08 | 12.11 | 12.09 | 12.09 | 12.13 | 12.53 | 12.48 | 12.52 | 12.48 | 12.47 |
| Specific gravity (Y) [—] | 0.501 | 0.668 | 0.999 | 1.200 | 1.429 | 0.442 | 0.669 | 1.001 | 1.198 | 1.423 |
| Latent heat storage material amount [g/m$^2$] | 1519.3 | 2484.5 | 4323.5 | 5454.4 | 6768.4 | 1563.8 | 2832.5 | 4673.9 | 5766.6 | 7034.3 |
| Heat storage capacity (Z) [kJ/m$^2$] | 320.1 | 484.9 | 801.0 | 994.6 | 1220.3 | 314.3 | 534.3 | 854.0 | 1043.7 | 1263.9 |
| Total amount of heat generation, 20-min value [MJ/m$^2$] | 3.70 | 8.11 | 9.11 | 8.36 | 8.11 | 9.01 | 8.10 | 9.08 | 6.37 | 3.62 |
| Heat generation property test | F | F | F | F | F | F | F | F | F | F |

(5) Conclusion

From the results of Experimental Example 3, a relational formula of the thickness X of the gypsum plate, the specific gravity Y of the gypsum plate, and the heat storage capacity Z in the Working Examples that satisfy the heat generation property grade 1 was determined by the least squares method using a solver, an optimization analysis tool of EXCEL, or spreadsheet software available from Microsoft Corporation.

As a result, it could be confirmed that when the thickness X of the gypsum plate, the specific gravity Y of the gypsum plate, and the heat storage capacity Z satisfied the following formula, the heat generation property grade 1 was satisfied.

Meanwhile, it could be confirmed that all of the Comparative Examples of Experimental Example 3 that did not satisfy the heat generation property grade 1, did not satisfy the following formula.

$$Z \leq 126.48X + 928.61Y - 1732.0$$

Figure 5:
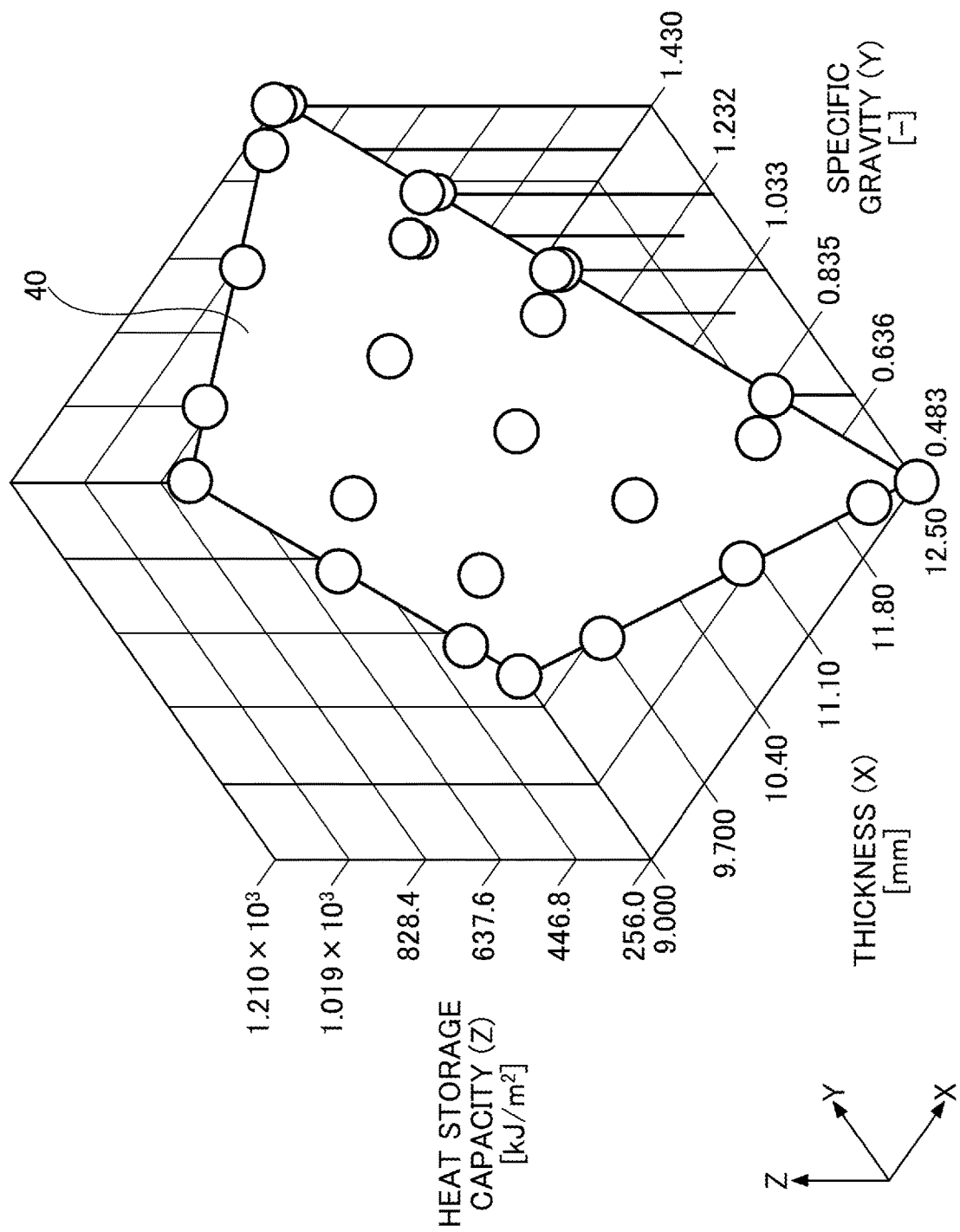
FIG. 5 illustrates a relation of thickness X of a gypsum plate, specific gravity Y of a gypsum plate, and heat storage capacity Z of a latent heat storage gypsum plate.

FIG. 5 illustrates the results of Experimental Example 3-2 and a plane 40 that is determined by the above formula.

In FIG. 5, the descriptions for Working Example 3-2-1 to Working Example Mar. 2, 2024 are omitted because they are positioned under the plane 40. As illustrated in FIG. 5, Working Example 3-2-1 to Working Example Mar. 2, 2024 and Comparative Example 3-2-1 to Comparative Example Mar. 2, 2027 are separated at the plane 40. Thus, it could be confirmed that when the above formula was satisfied, the heat generation property grade 1 was satisfied.

While the latent heat storage gypsum plate and the partition structure have been described above by way of, for example, the embodiments, the present invention is not limited to the above embodiments. Various modifications and changes are possible within the scope of the subject matter as recited in the claims.

The present international application claims priority to Japanese Patent Application No. 2021-095442, filed Jun. 7, 2021, and the contents of Japanese Patent Application No. 2021-095442 are incorporated in the present international application by reference in their entirety.

DESCRIPTION OF THE REFERENCE NUMERAL 10 latent heat storage gypsum plate
11 gypsum plate
11A first main face
11B second main face
X thickness
12 latent heat storage layer
201, 202, 203 partition structure
21, 22 base material
Y specific gravity
Z heat storage capacity

The invention claimed is:

1. A latent heat storage gypsum plate, comprising:
a gypsum plate having a first main face and a second main face that is located on an opposite side of the gypsum plate from the first main face; and
a latent heat storage layer disposed over at least part of the first main face of the gypsum plate, the latent heat storage layer including a latent heat storage material and a binder,
wherein a heat storage capacity of the latent heat storage gypsum plate is 260 KJ/m² or more, the heat storage capacity being measured in a measurement temperature range of 15° C. or higher and 35° C. or lower through heat storage capacity measurement specified in ASTM C 1784, and
the latent heat storage gypsum plate exhibits heat generation property grade 1 as evaluated by a heat generation property test specified in JIS A 6901 (2014), with the first main face being set as a back face, and
wherein the latent heat storage gypsum plate satisfies a relation of formula (1) below:

$$Z \leq 126.48X + 928.61Y - 1732.0 \quad (1)$$

where X is a thickness (mm) of the gypsum plate, Y is a specific gravity of the gypsum plate, and Z is the heat storage capacity (kJ/m²).

2. The latent heat storage gypsum plate according to claim 1, wherein the gypsum plate has a thickness of 9.0 mm or larger and a specific gravity of 0.35 or higher.

3. A partition structure that partitions an indoor space, the partition structure comprising:
the latent heat storage gypsum plate of claim 2; and
a base material that supports the latent heat storage gypsum plate,
wherein the second main face of the gypsum plate included in the latent heat storage gypsum plate is located to face the indoor space.

4. The latent heat storage gypsum plate according to claim 1, wherein the latent heat storage layer includes the latent heat storage material at a concentration of 10 parts by mass or more and 69 parts by mass or less, with the latent heat storage layer being 100 parts by mass.

5. A partition structure that partitions an indoor space, the partition structure comprising:
the latent heat storage gypsum plate of claim 4; and
a base material that supports the latent heat storage gypsum plate,
wherein the second main face of the gypsum plate included in the latent heat storage gypsum plate is located to face the indoor space.

6. The latent heat storage gypsum plate according to claim 1, wherein the binder is one or more selected from the group consisting of inorganic binders and organic binders.

7. A partition structure that partitions an indoor space, the partition structure comprising:
the latent heat storage gypsum plate of claim 6; and
a base material that supports the latent heat storage gypsum plate,
wherein the second main face of the gypsum plate included in the latent heat storage gypsum plate is located to face the indoor space.

8. The latent heat storage gypsum plate according to claim 1, wherein the binder includes one or more compounds selected from the group consisting of alkali metal silicate-based binders and vinyl acetate-based binders.

9. A partition structure that partitions an indoor space, the partition structure comprising:
the latent heat storage gypsum plate of claim 8; and
a base material that supports the latent heat storage gypsum plate,
wherein the second main face of the gypsum plate included in the latent heat storage gypsum plate is located to face the indoor space.

10. The latent heat storage gypsum plate according to claim 1, wherein the latent heat storage layer includes inorganic powder.

11. A partition structure that partitions an indoor space, the partition structure comprising:
the latent heat storage gypsum plate of claim 10; and
a base material that supports the latent heat storage gypsum plate,
wherein the second main face of the gypsum plate included in the latent heat storage gypsum plate is located to face the indoor space.

12. A partition structure that partitions an indoor space, the partition structure comprising:
the latent heat storage gypsum plate of claim 1; and
a base material that supports the latent heat storage gypsum plate,
wherein the second main face of the gypsum plate included in the latent heat storage gypsum plate is located to face the indoor space.

* * * * *